(12) United States Patent
Buckley

(10) Patent No.: US 11,056,040 B1
(45) Date of Patent: Jul. 6, 2021

(54) SYSTEMS AND METHODS FOR MASK-BASED TEMPORAL DITHERING

(71) Applicant: Facebook Technologies, LLC, Menlo Park, CA (US)

(72) Inventor: Edward Buckley, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 1 day.

(21) Appl. No.: 16/689,684

(22) Filed: Nov. 20, 2019

(51) Int. Cl.
  *G09G 3/20* (2006.01)
  *G02B 27/01* (2006.01)
  *G06T 19/00* (2011.01)
  *G06T 7/90* (2017.01)

(52) U.S. Cl.
  CPC ......... *G09G 3/2055* (2013.01); *G02B 27/017* (2013.01); *G06T 7/90* (2017.01); *G06T 19/006* (2013.01); *G02B 2027/014* (2013.01); *G06T 2207/10021* (2013.01); *G06T 2207/20021* (2013.01); *G09G 2340/06* (2013.01)

(58) Field of Classification Search
  CPC .......................... G09G 3/2055; G09G 3/2044
  See application file for complete search history.

(56) References Cited

U.S. PATENT DOCUMENTS

| | | | | |
|---|---|---|---|---|
| 6,243,055 B1* | 6/2001 | Fergason | ............. | H04N 9/3155 345/32 |
| 2003/0184809 A1* | 10/2003 | Clouthier | ................ | G06T 9/005 358/3.01 |
| 2004/0189679 A1* | 9/2004 | Ito | ............................ | G09G 3/20 345/690 |
| 2005/0190610 A1* | 9/2005 | Furukawa | ............. | G09G 3/2055 365/189.05 |
| 2006/0256355 A1* | 11/2006 | Karito | .................. | H04N 1/4055 358/1.9 |
| 2007/0263257 A1* | 11/2007 | Pai | ........................ | G09G 3/3607 358/3.14 |
| 2015/0371123 A1* | 12/2015 | Kodama | ............ | G06K 15/1822 358/3.14 |
| 2019/0171856 A1* | 6/2019 | Sharma | ................ | G06K 7/1417 |

* cited by examiner

*Primary Examiner* — Phi Hoang
(74) *Attorney, Agent, or Firm* — Baker Botts L.L.P.

(57) ABSTRACT

In one embodiment, a computing system may determine that a target grayscale value for a frame falls within a predetermined grayscale range. The system may compute, based on the target grayscale value, barycentric weights for a predetermined barycentric coordinate system associated with vertices that each represents a subframe combination of zero or more subframe identifiers. The system select, using the barycentric weights and threshold values associated with respective dots in a dithering mask, a set of non-overlapping dot patterns from the dithering mask corresponding to the vertices of the barycentric coordinate system. The dots in the dithering mask may satisfy a spatial stacking constraint. The system may generate subframes to represent the frame based on the set of non-overlapping dot patterns and the subframe combination represented by each of the vertices.

20 Claims, 13 Drawing Sheets

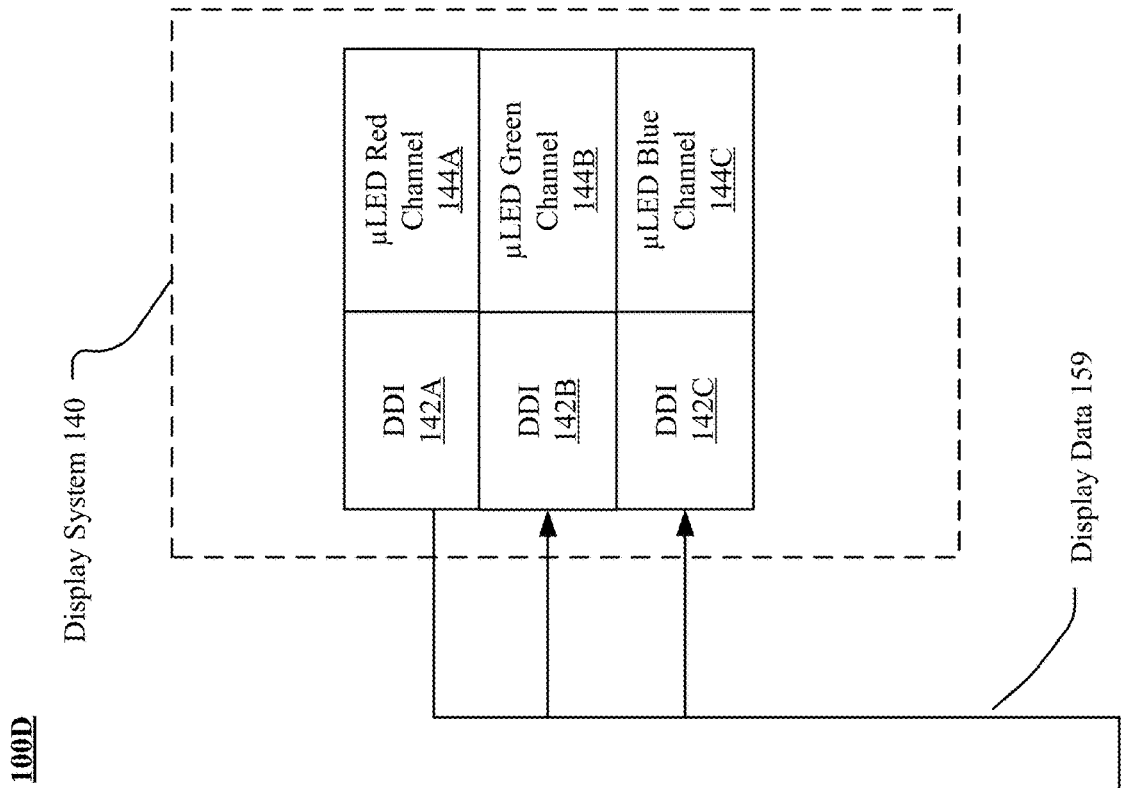
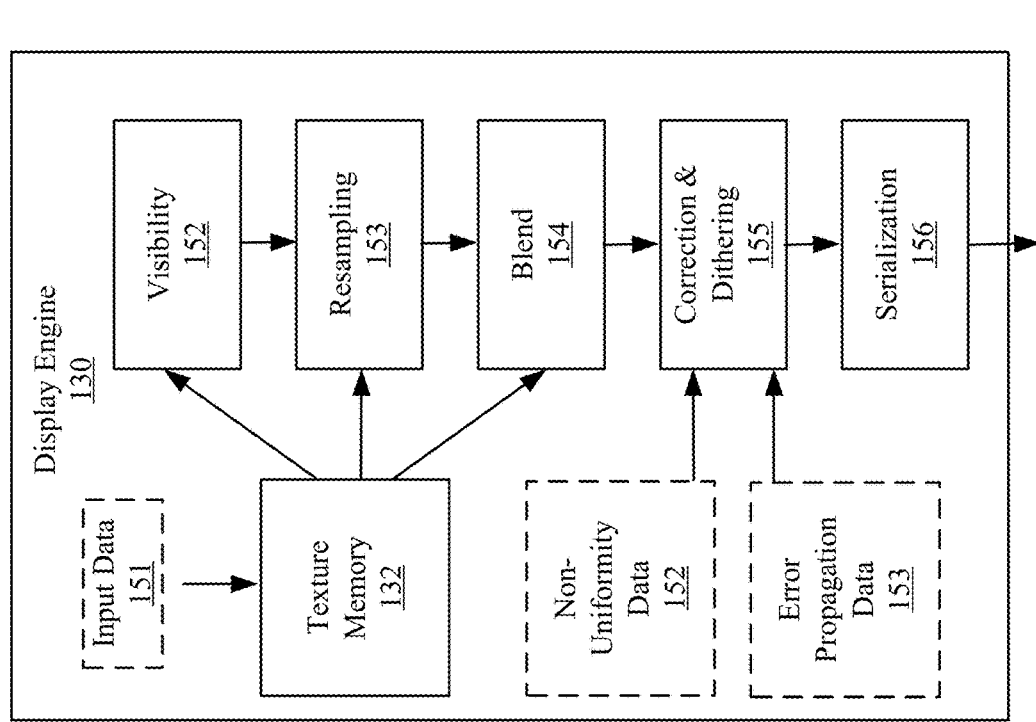
FIG. 1D

700

710 — Determine that a target grayscale value $p$ for a frame falls within one of a number of predetermined grayscale ranges 720 — Compute, based on the target grayscale value $p$, barycentric weights for a predetermined barycentric coordinate system associated with the predetermined grayscale ranges, wherein the barycentric coordinate system is associated with vertices that each represents a subframe combination of zero or more subframe identifiers selected from a number of subframe identifiers 730 — Select, using the barycentric weights and threshold values associated with respective dots in a dithering mask, a set of non-overlapping dot patterns from the dithering mask corresponding to the vertices of the barycentric coordinate system, wherein the dots in the dithering mask satisfy a spatial stacking constraint according to the threshold values associated with the dots 740 — Generate a number of subframes corresponding to the subframe identifiers to represent the frame, wherein the subframes are generated based on the set of non-overlapping dot patterns and the subframe combination represented by each of the vertices

SYSTEMS AND METHODS FOR MASK-BASED TEMPORAL DITHERING

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of generating three subframes based on a dithering mask and a set of barycentric coordinate systems to represent a target image. As an example and not by way of limitation, the method may use a unit cube's eight vertices to represent the three subframes (S1, S2, S3) and combinations of zero or more subframes (no subframes, S1+S2, S1+S3, S2+S3, S1+S2+S3). It is notable that the subframe combinations herein are for example purpose only and the systems, methods, and processes described in this disclosure are not limited thereto. The subframe combinations may be any suitable combinations in any suitable orders. For example, the systems, methods, and processes are still applicable if one or more of the subframes (e.g., S1, S2, S3) are swapped. The unit cube may be divided into six tetrahedrons, four of which may be used for determining the barycentric coordinate systems for generating the subframes. For a target grayscale value (e.g., an average grayscale value of a tile region in a target image), the system may first determine which of the tetrahedrons (e.g., one of the four tetrahedrons for determining the barycentric coordinate system) the grayscale value falls in based on the threshold ranges associated with the tetrahedrons. Then, the system may determine a weight vector (including the barycentric weights) and a vertex vector (including combination of subframe identifiers) based on the associated tetrahedron which the grayscale value falls in. After that, the system may determine four non-overlapping dot sets of the dither mask (e.g., a blue-noise dithering mask) corresponding to the four barycentric weight values of the weight vector. At last, the system may determine the dot sets that are to be turned on or included in each of the three subframes based on the four non-overlapping dot sets of the dithering mask and a set of rules for assigning dots to the subframes. As a result, the system may generate three subframes satisfying a spatial-stacking property as determined by the dithering mask.

For a target image having a larger size than the dithering mask, the dithering mask may be replicated to cover the target image. To determine in which subframe(s) a given dot of the dithering mask should be included, the system may first determine the dithering mask threshold value Q associated with that dot based on a replicated mask covering that region of the target image. Then, the system may compare the dithering mask threshold value Q to the cumulative sum of the barycentric weights of the target grayscale value with respect to the associated tetrahedron. The system may select a tetrahedron vertex based on the result of the comparison. The selected tetrahedron vertex may be associated with a combination of zero or more subframe identifiers.

In particular embodiments, the system may first receive a target pixel value p which could be an average pixel value of a target region of a target image. The target pixel value p may be normalized to a range of $[0, 1]$. The system may first determine which range the target pixel value p falls within among the four value ranges of $0 \leq p < 1/3$, $1/3 \leq p < 1/2$, $1/2 \leq p < 2/3$, and $2/3 \leq p \leq 1$. When the target pixel value p falls within the value range of $0 \leq p < 1/3$, the system may select a first tetrahedron of a unit cube for determining a barycentric coordinate system. The selected tetrahedron may have its vertices being associated with subframe identifiers of [OFF, S1, S2, S3]. The system may determine the barycentric weights for the target pixel value p with respect to the selected tetrahedron using a weight vector $w = [1-3p, p, p, p]$. Then, the system may determine four non-overlapping dot sets of the dithering mask based on the four barycentric weight values of $1-3p$, $p$, $p$, and $p$ of the weight vector $w$. For example, the system may determine a first dot set A1 including dots in the dithering mask having threshold values below the mask threshold of $1-3p$, a second dot set B1 including dots in the dithering mask having threshold values between the thresholds of $1-3p$ and $(1-3p)+p$, a third dot set C1 including dots in the dithering mask having threshold values between the thresholds of $(1-3p)+p$, and $(1-3p)+p+p$, and a fourth dot set D1 including dots in the dithering mask having threshold values between the thresholds of $(1-3p)+p+p$, and 1. Each dot set of the four non-overlapping dot sets may include a percentage of dots of the total dots in the mask corresponding to a barycentric weight value of the target pixel value. After that, the system may assign the dots to the subframes by: (1) excluding dots in the first dot set A1 from any of the three subframes; and (2) including dots in the second dot set B1 in the first subframe S1; (3) including dots in the third dot set C1 in the second subframe S2; and (4) including dots on the fourth dot set D1 in the third subframe S3. As a result, the three subframes may satisfy the spatial stacking property by each including a non-overlapping dot set and not sharing any dots with other subframes.

When the target pixel value p falls within the value range of $1/3 \leq p < 1/2$, the system may select a second tetrahedron of the unit cube for determining a barycentric coordinate system. The selected tetrahedron may have its vertices being associated with subframe identifiers of [S1, S2, S3, S1+3]. The system may determine the barycentric weights for the target pixel value p with respect to the selected tetrahedron using a weight vector of $w = [1-2p, p, 1-2p, 3p-1]$. Then, the system may determine four non-overlapping dot sets of the dithering mask based on the four barycentric weight values of $1-2p$, $p$, $1-2p$, and $3p-1$ of the weight vector $w$. For example, the system may determine a first dot set A2 including dots in the dithering mask having threshold values below the mask threshold of 1−2p, a second dot set B2 including dots in the dithering mask having threshold values in the range of [1−2p, (1−2p)+p], a third dot set C2 including dots in the dithering mask having threshold values on the range of [(1−2p)+p, (1−2p)+p+(1−2p)], and a fourth dot set D2 including dots in the dithering mask having threshold values in the range of [(1−2p)+p+(1−2p), 1]. Each dot set of the four non-overlapping dot sets may include a percentage of dots of the total dots in the mask corresponding to a barycentric weight value of the target pixel value. After that, the system may assign the dot sets to the subframes by: (1) including on the first dot set A2 in the first subframe S1; (2) including the second dot set B2 in the second subframe S2; (3) including the third dot set C2 in the third subframe S3; and (4) including the fourth dot set D2 in both the first subframe S1 and the third subframe S3. As a result, the three subframes may include dot sets satisfying the spatial stacking property as determined by the dithering mask.

When the target pixel value p falls within the value range of ½≤p<⅔, the system may select a third tetrahedron of the unit cube for determining the barycentric coordinate system. The selected tetrahedron may have its vertices being associated with the subframe identifiers of [ S1+S3, S2+S3, S2, S1+S2]. The system may determine the barycentric weights for the target pixel value p with respect to the selected tetrahedron using a weight vector w=[2p−1, 2p−1, 2−3p, 1−p]. Then, the system may determine four non-overlapping dot sets of the dithering mask based on the four weight values of 2p−1, 2p−1, 2−3p, and 1−p of the weight vector w. For example, the system may determine a first dot set A3 including dots in the dithering mask having threshold values below the mask threshold of 2p−1, a second dot set B3 including dots in the dithering mask having threshold values in the range of [2p−1, (2p−1)+(2p−1)], a third dot set C3 including dots in the dithering mask having threshold values in the range of [(2p−1)+(2p−1), (2p−1)+(2p−1)+(2−3p)], and a fourth dot set D3 including dots in the dithering mask having threshold values in the range of [(2p−1)+(2p−1)+(2−3p), 1]. Each dot set of the four non-overlapping dot sets may include a percentage of dots of the total dots in the mask corresponding to a weight value of the weight vector. After that, the system may assign the dot sets to the subframes by: (1) including the first dot set A3 in the first and third subframes (S1+S3); (2) including the second dot set B3 in the second and third subframes (S2+S3); (3) including the third dot set C3 in the second subframe S2; and (4) including the fourth dot set D3 in both the first and second subframe (S1+S2). As a result, the three subframes may include dot sets satisfying the spatial stacking property as determined by the dithering mask.

When the target pixel value p falls within the value range of ⅔≤p≤1, the system may determine select a fourth tetrahedron of the unit cube for determining the barycentric coordinate system. The selected tetrahedron may have its vertices being associated with subframe identifiers of [S1+S3, S2+S3, S1+S2, S1+S2+S3]. The system may determine the barycentric weights for the target pixel value p with respect to the selected tetrahedron using a weight vector using w=[1−p, 1−p, 1−p, 3p−2]. Then, the system may determine four non-overlapping dot sets of the dithering mask based on the four weight values of 1−p, 1−p, 1−p, and 3p−2 of the weight vector w. For example, the system may determine a first dot set A4 including dots in the dithering mask having threshold value below a mask threshold of 1−p, a second dot set B4 including dots in the dithering mask having threshold values in the range of [1−p, (1−p)+(1−p)], a third dot set C4 including dots in the dithering mask having threshold value in the range of [(1−p)+(1−p), (1−p)+(1−p)+(1−p)], and a fourth dot set D4 including dots in the dithering mask having threshold values in the range of [(1−p)+(1−p)+(1−p), 1]. Each dot set of the four non-overlapping dot sets may include a percentage of dots of the total dots in the mask corresponding to a barycentric weight value of the weight vector. After that, the system may assign the dot sets to the subframes by: (1) including the first dot set A4 in the first and third subframes (S1+S3); (2) including the second dot set B4 in the second and third subframes (S2+S3); (3) including the third dot set C4 in the first and second subframe S1+S2; and (4) including the fourth dot set D4 in the first, second, and third subframes (S1+S2+S3). As a result, the three subframes may include dot sets satisfying the spatial stacking property as determined by the dithering mask.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1D illustrates an example graphic pipeline of the display engine for generating display image data.

FIG. 7 illustrates an example method for generating a number of subframes based on a barycentric coordinate system and a dithering mask for representing a target frame.

DESCRIPTION OF EXAMPLE EMBODIMENTS

Figure 1A:
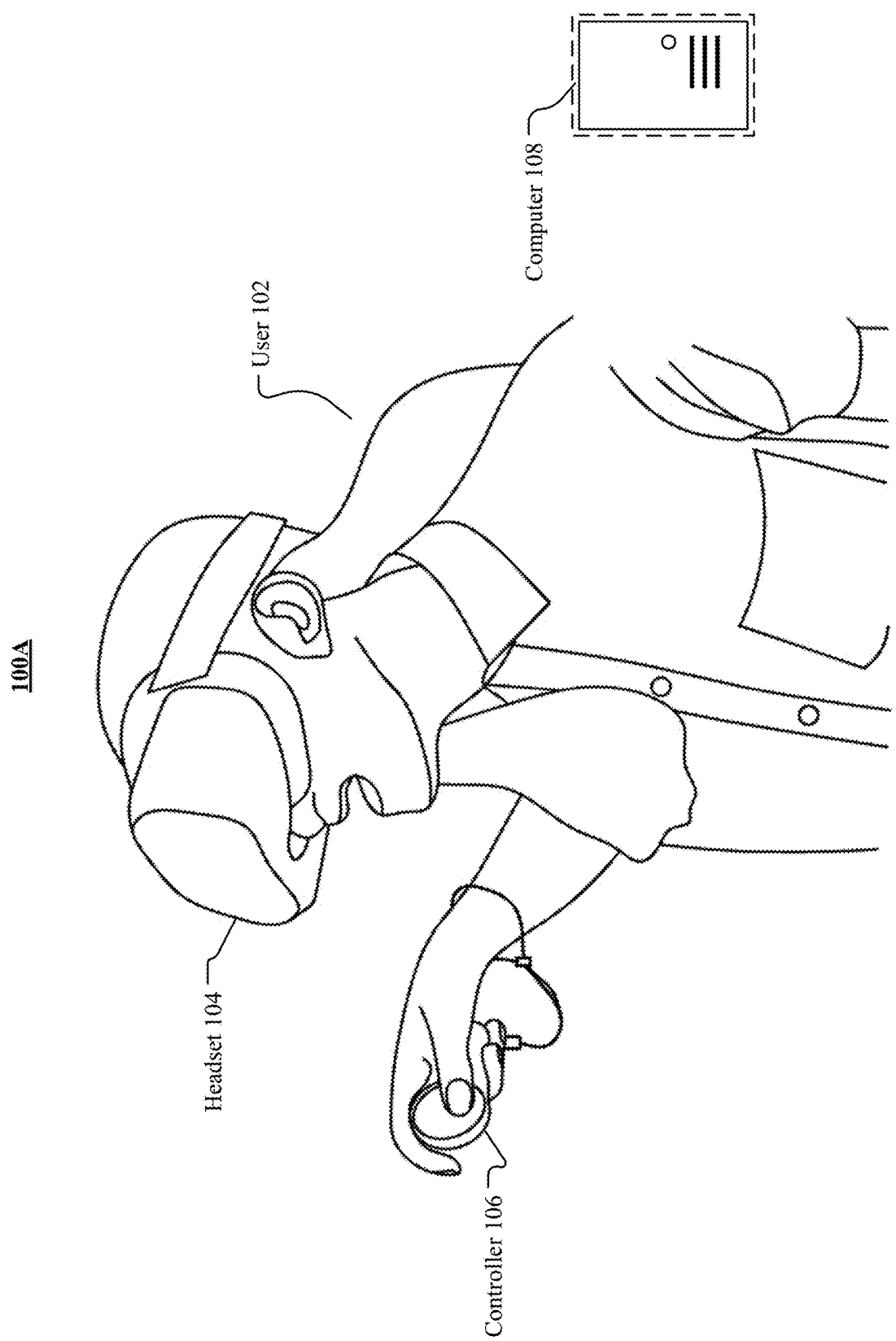
FIG. 1A illustrates an example artificial reality system.

The number of available bits in a display may limit the display's color depth or gray scale level. To achieve display results with higher effective grayscale level, displays may use a series of temporal subframes with less grayscale level bits to create the illusion of a target image with more grayscale level bits. However, subframes with naïve stacking property (e.g., direct stacking property without using a dithering mask) and unequal weights (e.g., determined by segmented quantization) may have artifacts (e.g., flashing and uneven luminance between different subframes) which may negatively impact the experience of the viewers. Furthermore, the dithering methods using a frame buffer for propagating errors to subsequent subframes may require extra memory space to be used as the frame buffer and need more memory resources.

In particular embodiments, the system may use a barycentric coordinate system and a dithering mask to generate a series of subframe images for representing a target image. The dithering mask may include a number of dot patterns with each dot pattern having a dot density corresponding to a grayscale level within the quantization range (e.g., 0-255 grayscale levels for 8-bit display). The dot patterns may be generated based on blue-noise distribution and satisfy spatial stacking property. For example, the dot pattern for grayscale level N may include the dot patterns for all lower grayscale levels from 0 to N-1. The dithering mask may include the dot patterns corresponding to all grayscale levels of the quantization range. Each dot in the dithering mask may correspond to a threshold value which equals to the lowest grayscale level allowing that dot to be included in a dot pattern. For a target pixel value, the system may determine a barycentric coordinate system based on a tetrahedron of a unit cube that the target pixel value falls in. The system may determine the barycentric weights for the target pixel value with respect to the barycentric coordinate system. The vertices of the barycentric coordinate system may represent combinations of zero or more subframe identifiers. The system may use the barycentric weights and threshold values associated with dots in the dithering mask to select a set of non-overlapping dot patterns. The system may generate a number of subframes based on the non-overlapping dot patterns and the combinations of the subframe identifier represented by the vertices of the barycentric coordinate system.

Particular embodiments of the system provide better image quality and improve user experience for AR/VR display by using multiple subframe images with less color depth to represent an image with greater color depth. Particular embodiments of the system generate subframe image with reduced or eliminated temporal artifacts such as flashes. Particular embodiments of the system improve the efficiency of AR/VR display by reducing the memory usage related to generating the temporal subframe images by using a dithering mask without using an error buffer. Particular embodiments of the system allow AR/VR display system to reduce the space and complexity of pixel circuits by having less gray level bits, and therefore miniaturize the size of the display system. Particular embodiments of the system make it possible for AR/VR displays to operate in monochrome mode with digital pixel circuits without using analog pixel circuits for full RGB operations.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
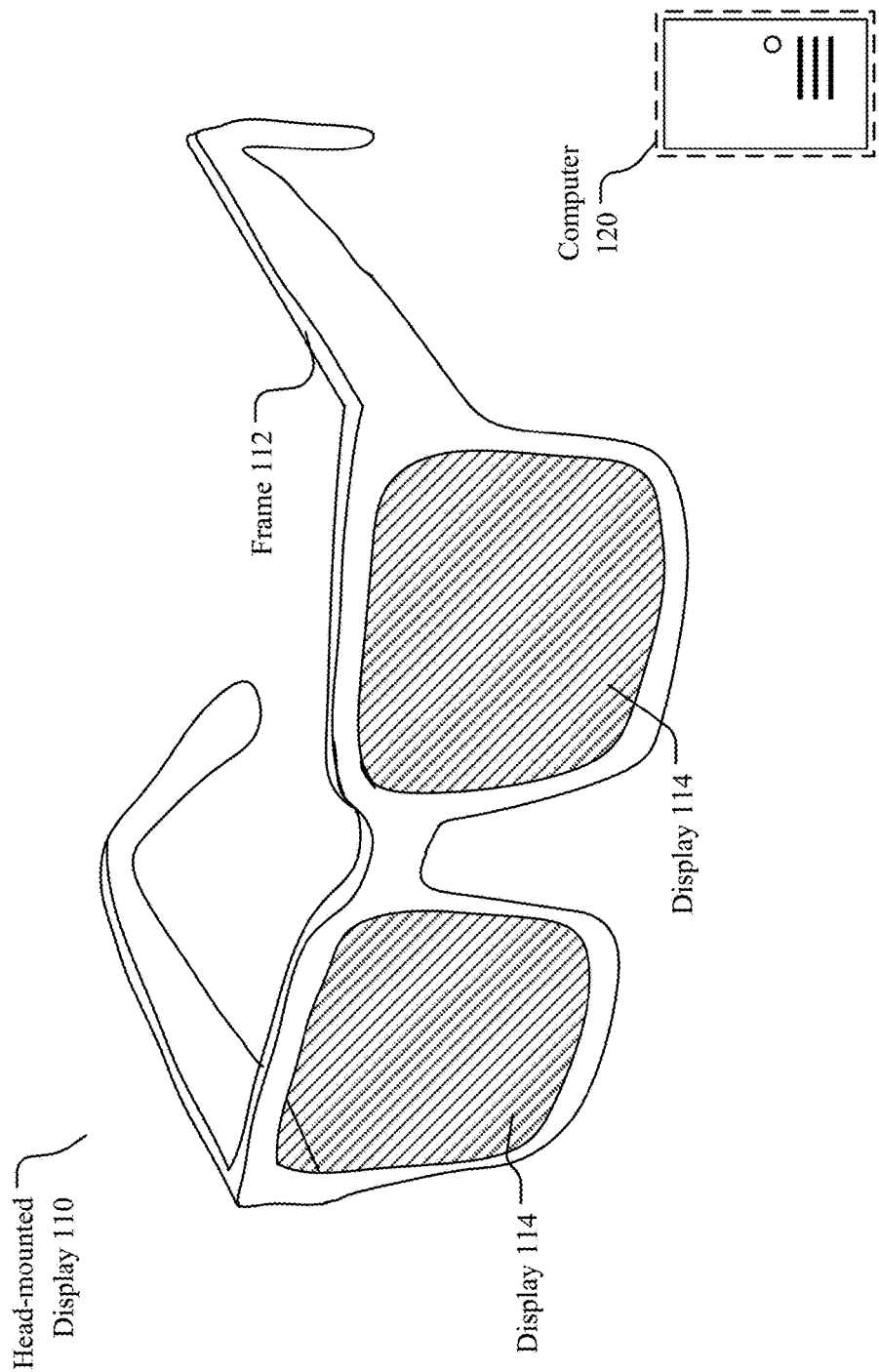
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
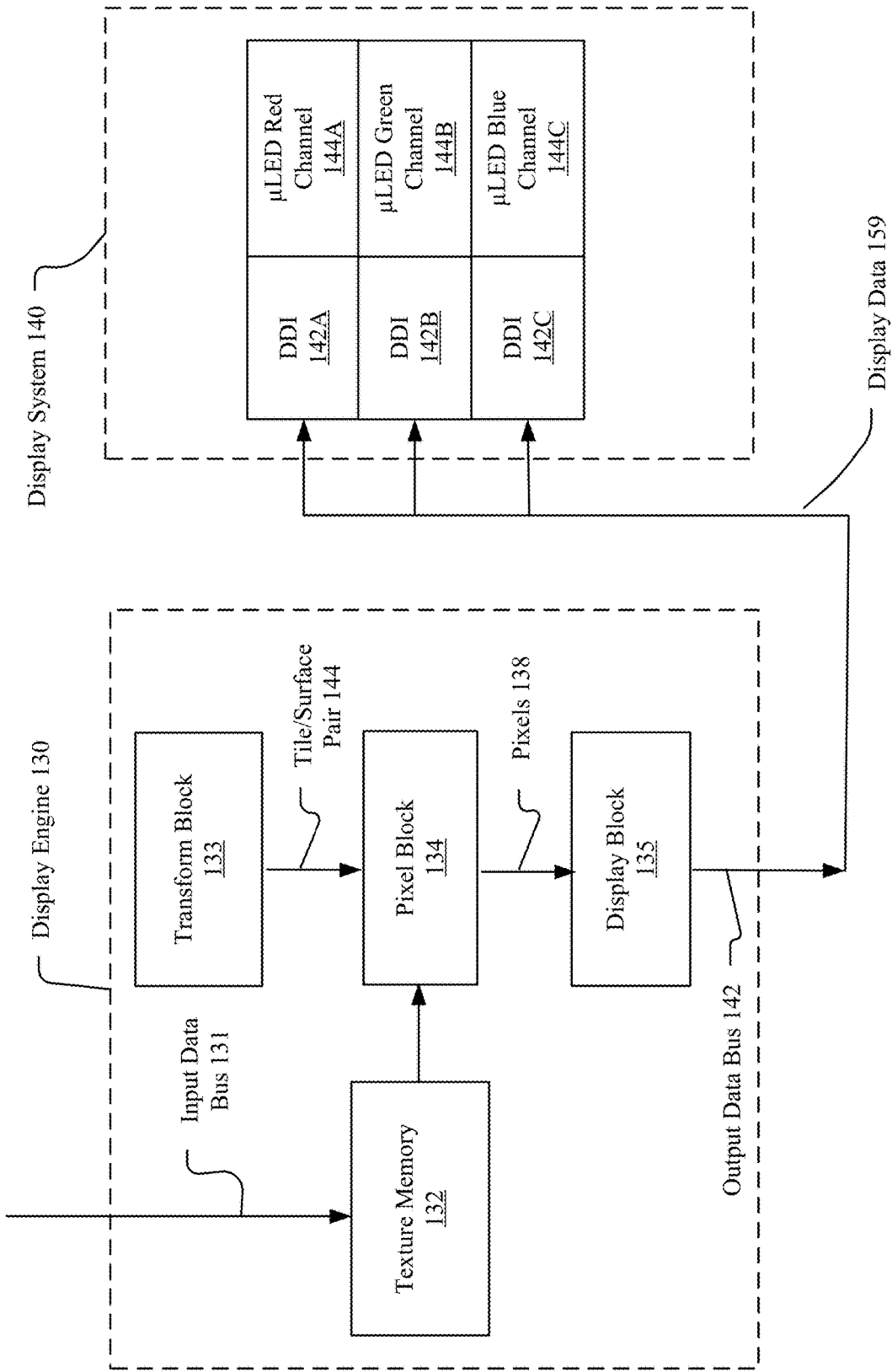
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (µLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
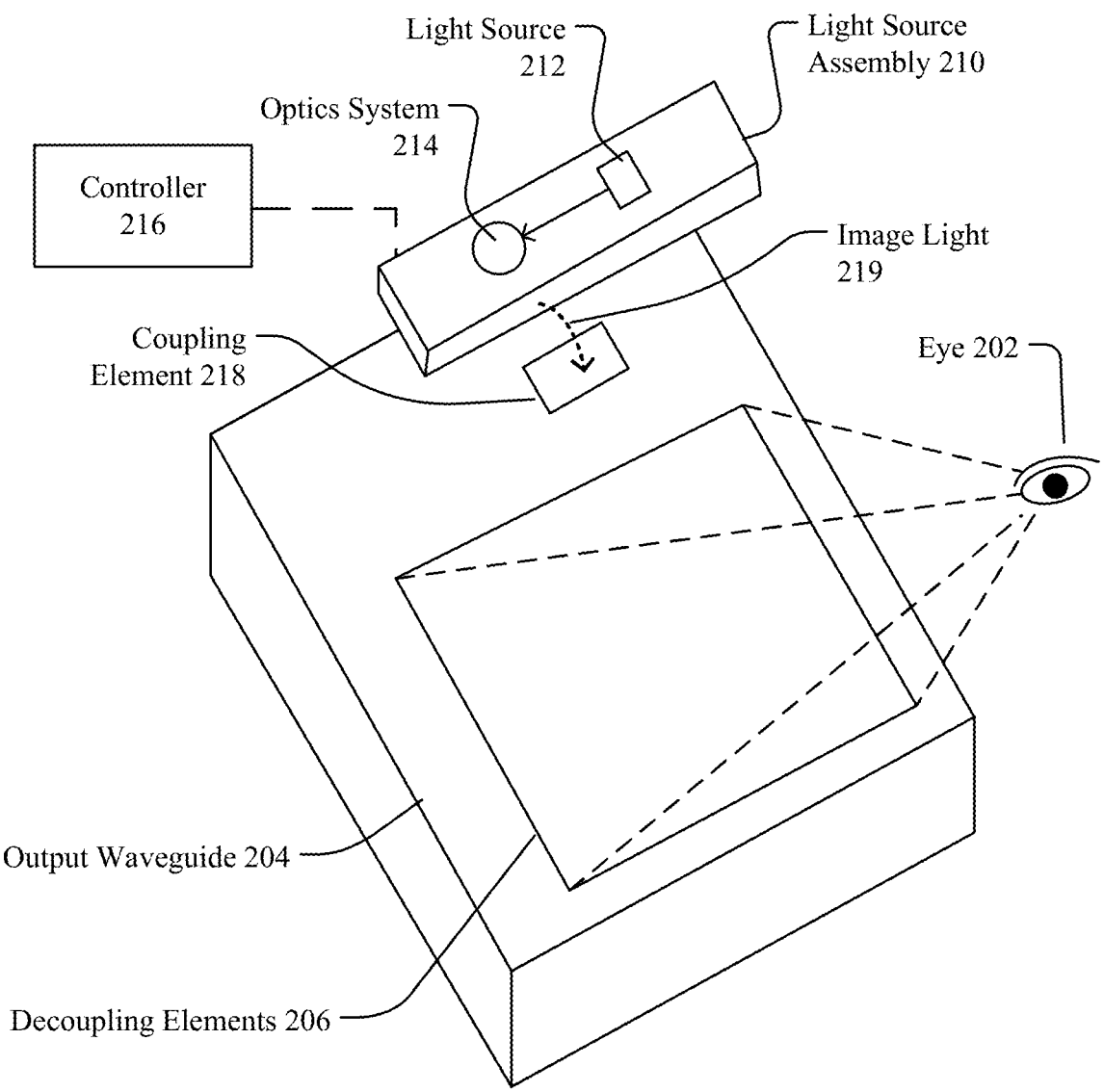
FIG. 2A illustrates an example scanning waveguide display.
Figure 3A:
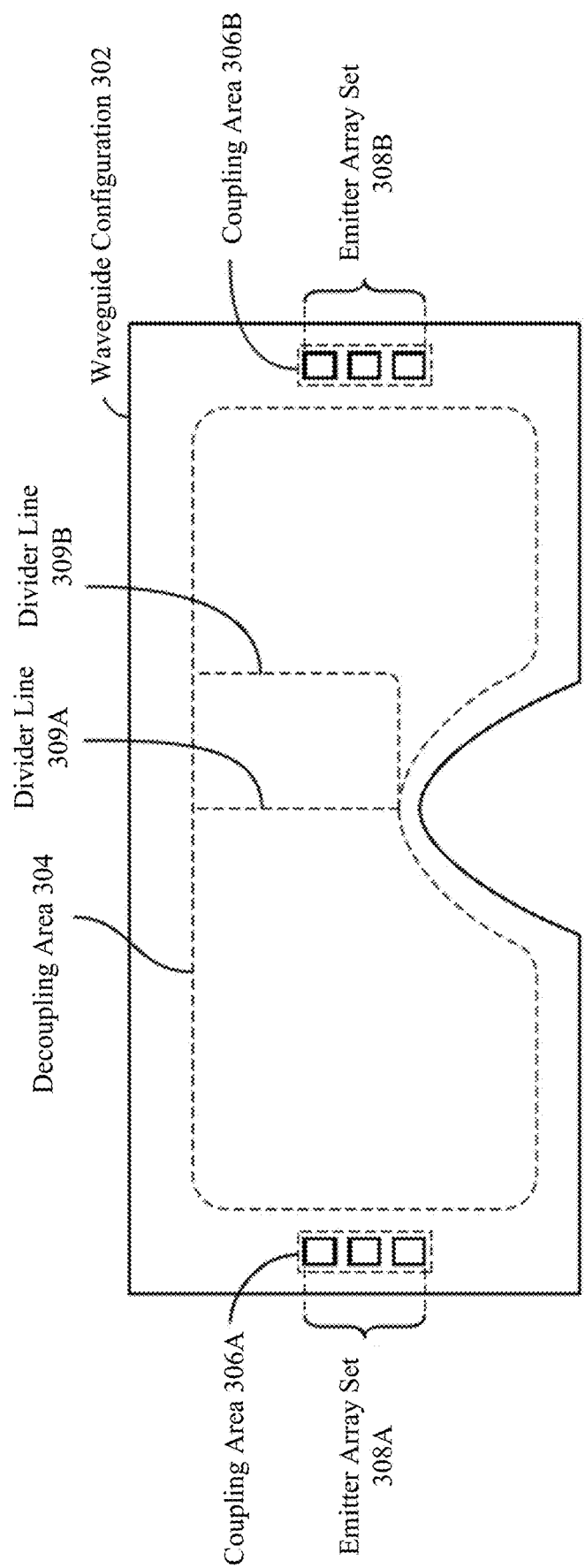
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
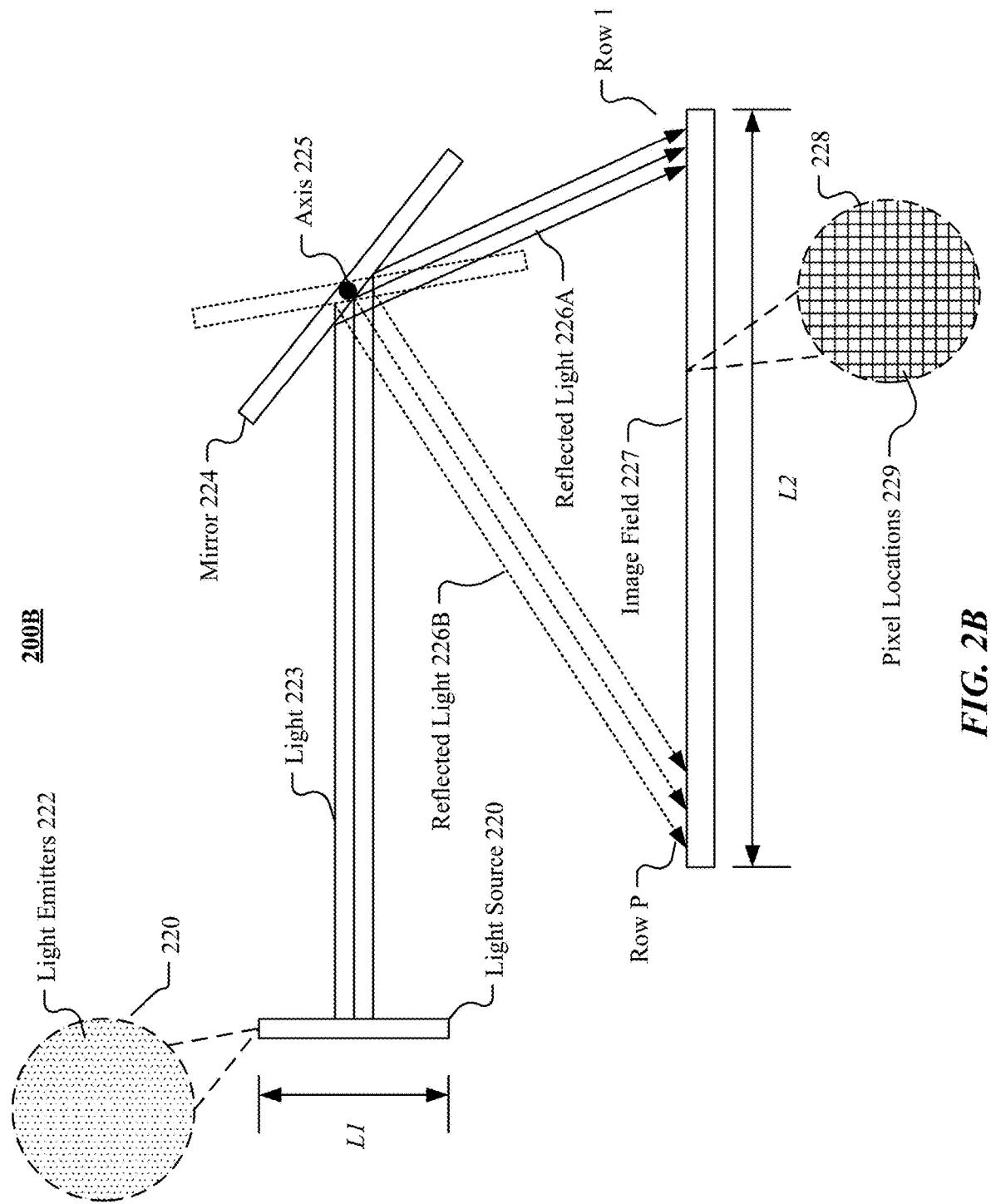
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
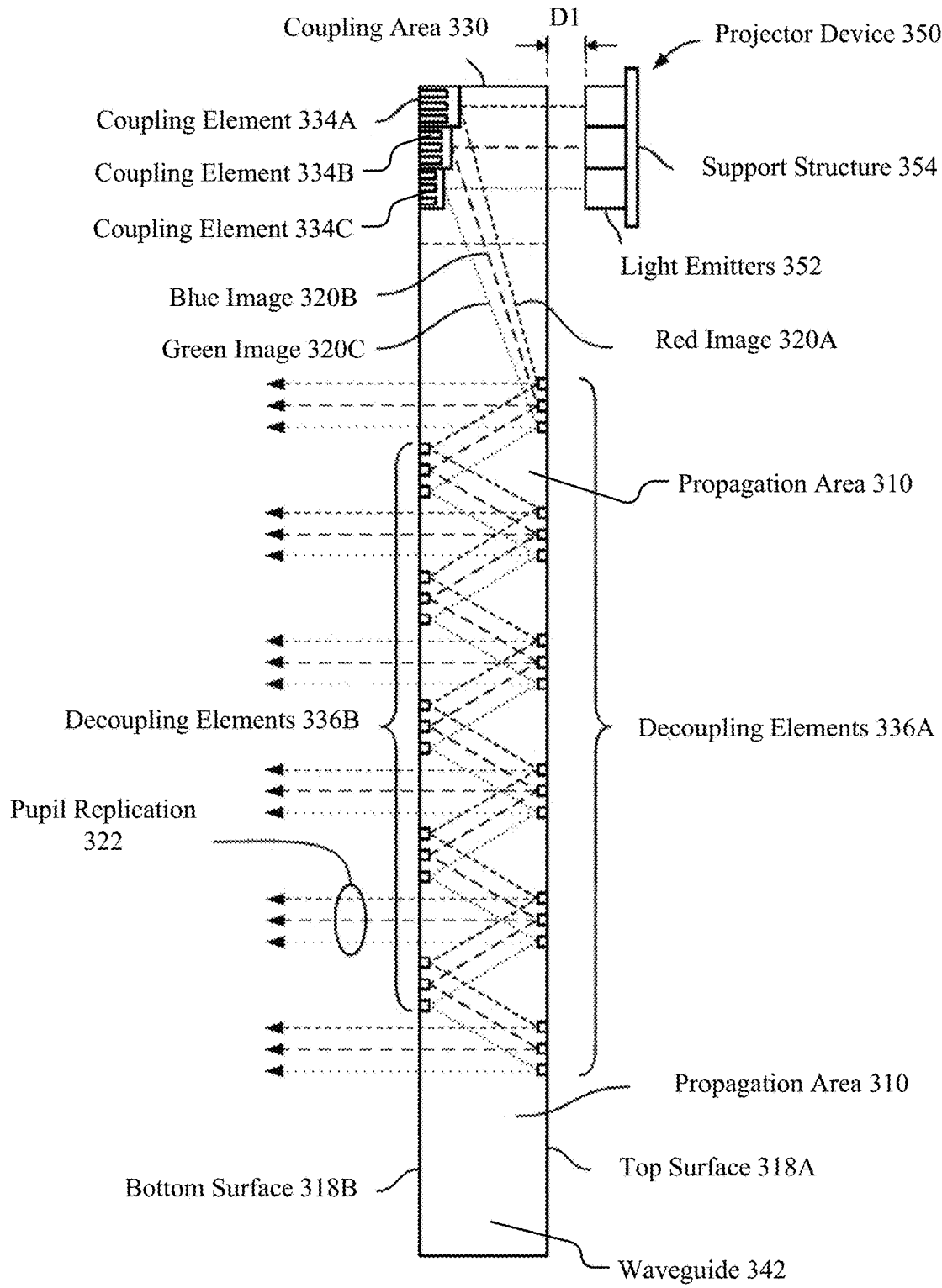
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

To improve the displayed image quality, displays with limited color depth or gray scale level may use spatio dithering to spread quantization errors to neighboring pixels and generate the illusion of increased color depth or gray scale level. To further increase the color depth or gray scale level, displays may generate a series of temporal subframe images with less gray level bits to give the illusion of a target image which has more gray level bits. Each subframe image may be dithered using spatio dithering techniques within that subframe image. The average of the series of subframe image may correspond to the image as perceived by the viewer. For example, for display an image with 8-bit pixels (i.e., 256 gray level), the system may use four subframe images each having 6-bit pixels (i.e., 64 gray level) to represent the 8-bit target image. As another example, an image with 8-bit pixels (i.e., 256 gray level) may be represented by 16 subframe images each having 4-bit pixels (i.e., 16 gray level). This would allow the display system to render images of more gray level (e.g., 8-bit pixels) with pixel circuits and supporting hardware for less gray level (e.g., 6-bit pixels or 4-bit pixels), and therefore reduce the space and size of the display system.

Figure 4A:
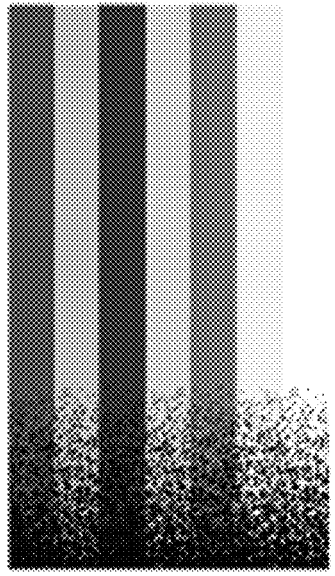
FIG. 4A illustrates an example target image to be represented by a series of subframe images with less color depth.
Figure 4B:
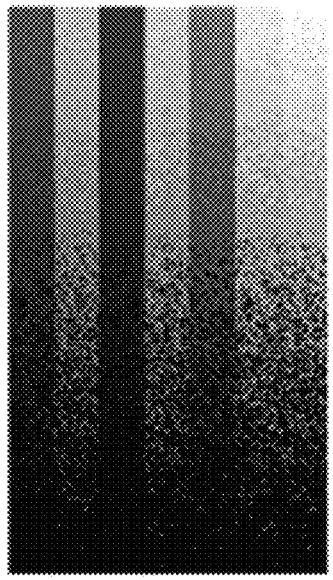
FIGS. 4B-D illustrate example subframe images generated using segmented quantization and spatio dithering method to represent the target image of FIG. 4A.
Figure 4C:
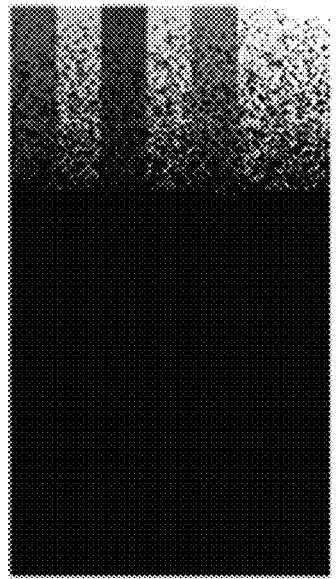
Figure 4D:
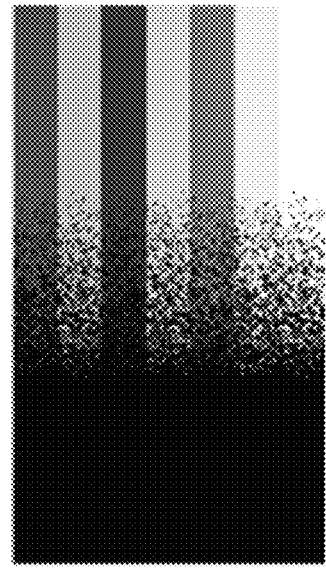

FIG. 4A illustrates an example target image 400A to be represented by a series of subframe images with less color depth. FIGS. 4B-D illustrate example subframe images 400B-D generated using segmented quantization and spatio dithering method to represent the target image 400A of FIG. 4A. The target image 400A may have more gray level bits than the physical display. The subframe images 400B-D may have gray level bits corresponding to the physical display, which is less than the target image 400A, and may be used to represent the target image using the time average as perceived by viewers. To generate each subframe image, the value of each pixel in the target image may be quantized according to a series of segmented value ranges corresponding to the weighted value ranges of the subframe images. Each subframe image may correspond to a segmented portion of the pixel range of the target image. The pixel value range of each subframe image may be weighted according to the corresponding segmented portion of the target image pixel range. As an example and not by way of limitation, the first, second and third subframes (as shown in FIGS. 4B-D, respectively) may cover the grayscale level ranges of [0, ⅓], [⅓, ⅔] and [⅔, 1] in the normalized grayscale level range of [0, 1]. Using this temporal stacking property, the temporal integrated noise related to the rendered images may be reduced by $1/N^2$ where N is the number of subframe images.

However, using this segmented quantization and spatio dithering method, even though the average luminance of the all subframe images over time is approximately equal to the target image, the subframes 400B-D may have very different luminance, as illustrated in FIGS. 4B-D. For example, the subframe image 400B capturing the lower energy bits may be very bright since most pixel value of the target image 400A may exceed the maximum pixel value of the subframe 400B. The subframe image 400D capturing the high energy bits may be very dim because most of the pixel value of the target image 400A may be below the pixel value range of the subframe 400D. This may work well for traditional displays such as LCD/LED displays since the user eyes do not change dramatically between the subframe images. However, it will create temporal artifacts such as flashes, and will negatively impact the quality of the displayed images and user experiences on the AR/VR system.

To solve the artifact problem in the subframe images, a spatio-temporal dithering method may be used to generate a series of subframe images for representing a target image with more even luminance distribution across all subframe images. The spatio-temporal dithering method may dither quantization errors both spatially to neighboring pixels of the same subframe image and temporally to the corresponding pixel of next subframe image of the series of subframe images. The temporally dithered quantization error of a pixel of a subframe image may be dithered to the corresponding pixel in the next subframe image of the series of subframe images in the time domain. However, these dithering methods may need an error buffer to provide temporal feedback, and therefore use more memory. To reduce the memory usage related to processes of generating subframe images, particular embodiments of the system may use a dithering mask and a barycentric coordinate system to generate the series of subframe images for representing a target image without using an error buffer.

Figure 5A:
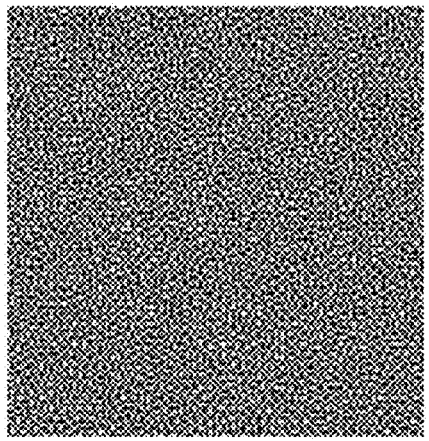
FIG. 5A illustrates an example dithering mask based on dot patterns with blue-noise properties and satisfying spatio stacking constraints.
Figure 5D:
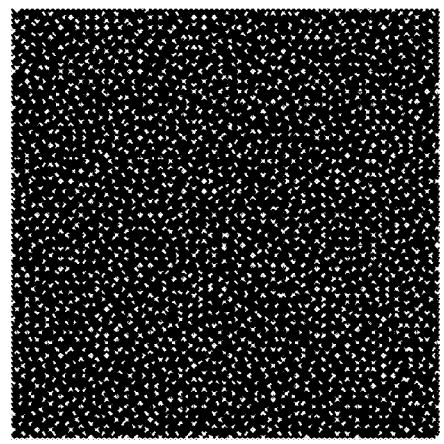
FIGS. 5B-D illustrate example dot patterns for grayscale level 1, 8, and 32 in a grayscale level range of [0, 255].
Figure 5C:
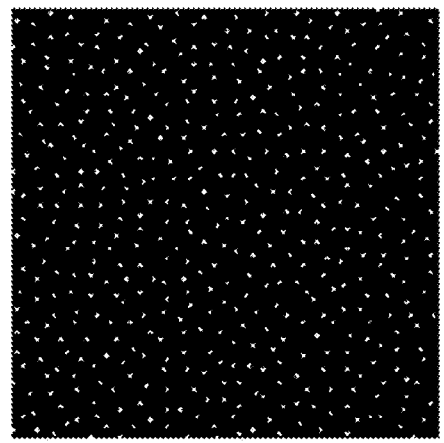
Figure 5B:
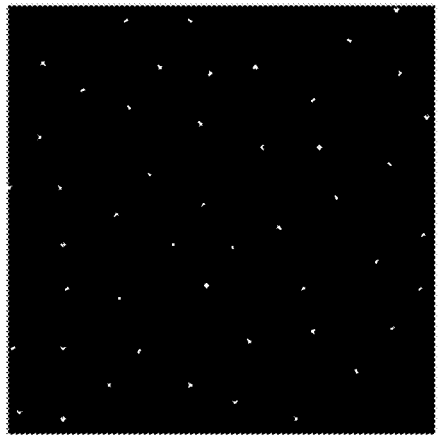

FIG. 5A illustrates an example dithering mask based on dot patterns with blue-noise properties and satisfying spatio stacking constraints. FIGS. 5B-D illustrate example dot patterns for grayscale level 1, 8, and 32 in the grayscale level range of [0, 255]. In particular embodiments, the system may generate spatio dithering masks based on dot patterns with blue-noise properties. The dithering mask may include a number of dot patterns with each dot pattern having a dot density corresponding to a grayscale level within the grayscale level range corresponding to the quantization range. A dot pattern for a higher grayscale level may have a higher dot density than a dot pattern for a lower grayscale level. The dot patterns may be chosen to have blue-noise properties (e.g., with the frequency spectrum being blue-noise weighted). The grayscale level range corresponding to the quantization range may be determined by the bit length of the display. For example, an 8-bit display may have a grayscale level range of [0, 255]. As another example, a 6-bit display may have a grayscale level range of [0, 63]. As another example, a 4-bit display may have a grayscale level range of [0-15]. In particular embodiments, the dot patterns of the dithering mask may have a spatial stacking property according to which a dot pattern of a grayscale level N may include all dot patterns of lower grayscale levels from 0 to N−1. For example, the dots in the dot pattern of grayscale level 1 (as shown in FIG. 5A) may be included in the dot pattern of grayscale level 8 (as shown in FIG. 5B) and in the dot pattern of grayscale level 32 (as shown in FIG. 5C). As another example, the dots in the dot pattern of grayscale level 8 (as shown in FIG. 5B) may be included in the dot pattern of the grayscale level 32 (as shown in FIG. 5C).

In particular embodiments, each dot in the dithering mask may correspond to a threshold value which equals to the lowest grayscale level allowing that dot to be turned on (i.e., the lowest grayscale level whose corresponding dot pattern includes that dot). From the lowest grayscale level to the highest grayscale level, once a dot is turned on (i.e., being included in a dot pattern of a grayscale level), the dot may stay in the turn-on state for all higher grayscale levels (i.e., being included in the dot patterns of all higher grayscale levels). The spatio stacking properties of the dot patterns may allow all dot patterns to be encoded into one dithering mask. In particular embodiments, the dithering mask (e.g., 500A in FIG. 5A) may include all the dot patterns (which are spatially stacked together) corresponding to all grayscale levels of the quantization range which may correspond to the gray level bits of the display (e.g., [0, 255] for 8-bit display, [0, 63] for 6-bit display, [0, 15] for 3-bit display). The dithering mask (e.g., 500A in FIG. 5A) may have a third dimension for storing the threshold values associated with the respective dots. In particular embodiments, the threshold values stored in the dithering mask may be the actual grayscale level values (e.g., [0, 255] for 8-bit display). In particular embodiments, the threshold values stored in the dithering mask may be normalized grayscale level values (e.g., [0, 1] for any bit display). In this case, the threshold values may be determined by the normalized grayscale level range of [0, 1] and the number of grayscale levels (e.g., 255 for 8-bit display). For example, for an 8-bit display, the threshold values could be 0, 1/255, 2/255 . . . 8/255 . . . 32/255 . . . 255/255, etc. As another example, for a 3-bit display, the threshold values could be 0, 1/7, 2/7, . . . 7/7, etc.

Figure 6:
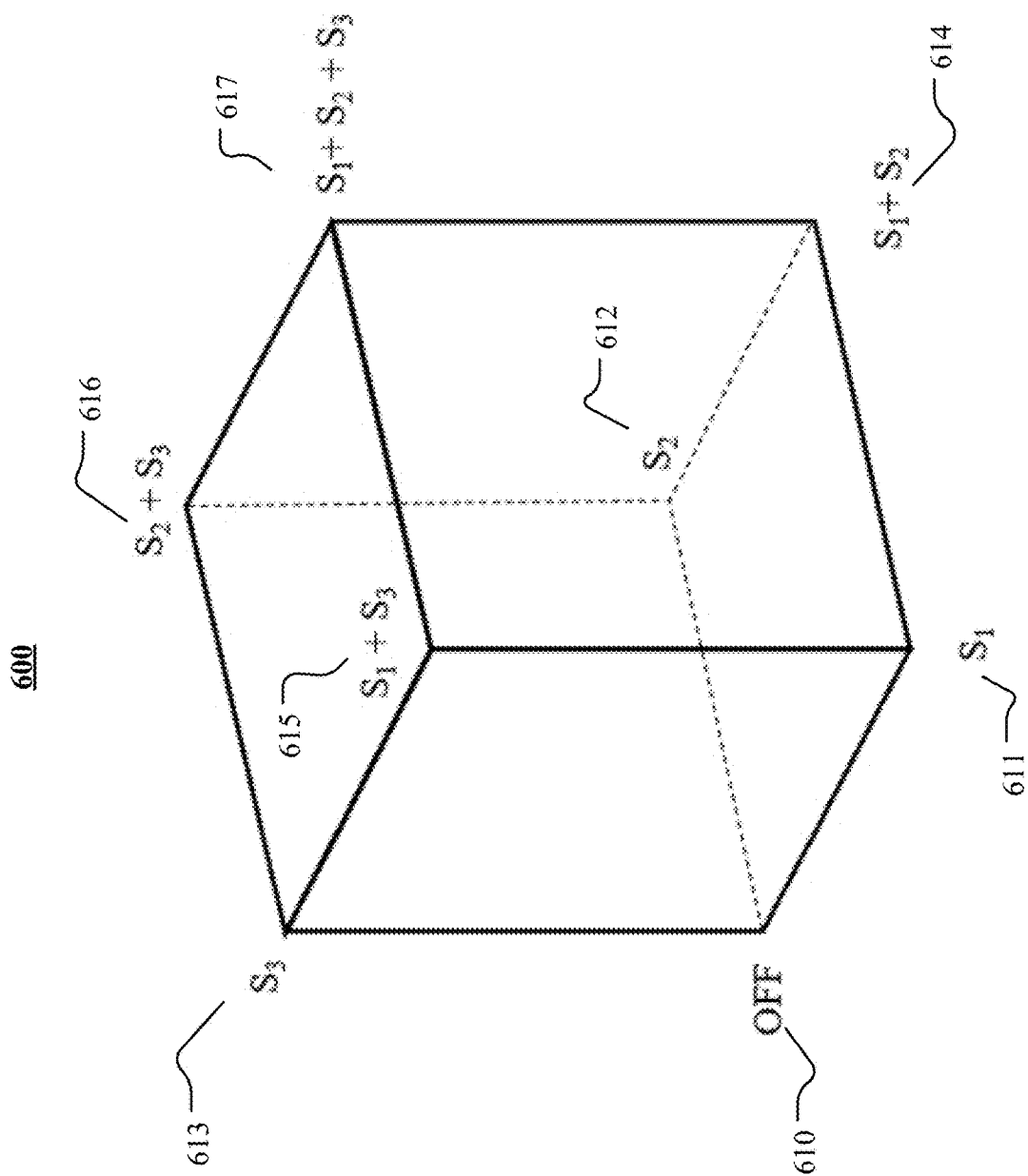
FIG. 6 illustrates an example unit cube for determining barycentric coordinate systems based on respective tetrahedrons of the unit cube.

FIG. 6 illustrates an example unit cube 600 for determining barycentric coordinate systems based on respective tetrahedrons of the unit cube 600. In particular embodiments, the system may use one or more barycentric coordinate systems each corresponding to a tetrahedron of the unit cube 600 for generating subframes to represent a target frame. The unit cube 600 may be partitioned into six tetrahedrons. For a point R within a tetrahedron, the point R may be represented by a linear combination of the tetrahedron vertices $V=[v_1, v_2, v_3, v_4]$ and associated barycentric weights $W=[w_1, w_2, w_3, w_4]$ of that point by $R=WV^T$. The six tetrahedrons of the unit cube may each have vertices corresponding to either zero or unity value as determined by the unit cube 600. The barycentric weights of a point within a tetrahedron may be determined based on comparison operations using only additions or subtractions.

In particular embodiments, the system may use the unit cube 600 for determining the barycentric coordinate systems based on respective tetrahedrons of the unit cube 600. The unit cube 600 may have vertices each being associated with a combination of subframe identifies including zero or more subframe identifiers (e.g., the vertex 610 being associated with zero subframe indicator OFF, the vertex 611 being associated with a first subframe indicator S1, the vertex 612 being associated with a second subframe indicator S2, the vertex 613 being associated with a third subframe indicator S3, the vertex 614 being associated with an indicator for the first subframe and the second subframe S1+S2, the vertex 615 being associated with an indicator for the first subframe and the third subframe S1+S3, the vertex 616 being associated with an indicator for the second subframe and the third subframe S2+S3, the vertex 617 being associated with an indicator for the first subframe, the second subframe, and the third subframe S1+S2+S3).

In particular embodiments, the unit cube 600 may be portioned into six tetrahedrons with four of them being used as the barycentric coordinate systems for generating subframes. As an example and not by way of limitation, the four tetrahedrons that are used as the barycentric coordinate systems may include, a first tetrahedron formed by the vertices of 610, 611, 612, and 613 corresponding to the subframe identifiers of OFF, S1, S2, and S3, respectively, a second tetrahedron formed by the vertices of 611, 612, 613, and 6145 corresponding the subframe identifier of S1, S2, S3, and S1+S3, respectively, a third tetrahedron formed by the vertices of 615, 616, 612, and 614 corresponding the subframe identifiers of S1+S3, S2+S3, S2, and S1+S2, respectively, and a fourth tetrahedron formed by the vertices of 615, 616, 614, and 617 corresponding to the subframe identifiers of S1+S3, S2+S3, S1+S2, and S1+S2+S3, respectively. In particular embodiments, the system may use the tetrahedrons and associated subframe identifiers for generating subframes based on a dithering mask having a blue-noise property, as will be described in detail later in this disclosure. The reason why four of the six tetrahedrons are used as the barycentric coordinate systems may be explained by a precondition that the temporal sum of the subframes is independent of the subframe ordering. With this precondition, the other two tetrahedrons may be included by the four tetrahedrons that are used as the barycentric coordinate systems. It is notable that the subframe combinations herein are for example purpose only and the systems, methods, and processes described in this disclosure are not limited thereto. The subframe combinations may be any suitable combinations in any suitable orders. For example, the systems, methods, and processes are still applicable if one or more of the subframes (e.g., S1, S2, S3) are swapped. It is notable that the mapping relations between the subframe combinations and the vertices of the barycentric coordinate system herein are for example purpose only and are not limited thereto. The mapping relations of the subframe combinations and the vertices of the barycentric coordinate system may be any suitable mapping relations and the systems, methods, and processes as described in this disclosure are applicable.

In particular embodiments, the system may generate a number of subframes with less grayscale level bits to represent a target image with more grayscale level bits based on the barycentric coordinate systems as determined by the tetrahedrons of a unit cube. As an example and not by way of limitation, the system may generate a set of three subframes for representing a target frame. The system may use the unit cube's eight vertices to represent combination of zero or more subframe identifiers (e.g., OFF, S1, S2, S3, S1+S2, S1+S3, S2+S3, S1+S2+S3). The unit cube may be divided into six tetrahedrons four of which may be used for determining the barycentric coordinate system. For a target grayscale value (e.g., an average grayscale value of a tile region of the dithering mask size), the system may first determine which of the tetrahedrons (e.g., one of the four tetrahedrons) that the grayscale value falls in based on the threshold ranges associated with the tetrahedrons. Then, the system may determine the barycentric weights of the target grayscale value with respect to the vertices of the tetrahedron. After that, the system may determine four non-overlapping dot sets of the dither mask (e.g., a blue-noise dithering mask) corresponding to the four barycentric weight values. Then, the system may determine the dot that are to be turned on in each of the three subframes based on the four non-overlapping dot sets of the dithering mask and a set of rules for assigning dots to the subframes. As a result, the system may generate three subframes satisfying a spatial-stacking property as determined by the dithering mask and the rules for assigning dots to the subframes.

In particular embodiments, the system may first receive a target pixel value p which could be an average pixel value of a target region of a target image. The system may first determine which range the target pixel value p falls within among the four value ranges of $0 \leq p < 1/3$, $1/3 \leq p < 1/2$, $1/2 \leq p < 2/3$, and $2/3 \leq p \leq 1$. Then, the system may determine an associated barycentric coordinate system corresponding to one of the four tetrahedrons based on the value range that the target pixel value falls within. Then, the system may determine the barycentric weights for the target pixel value based on the associated barycentric coordinate system corresponding to the associated tetrahedron. In particular embodiments, for the four pixel value ranges of $0 \leq p < 1/3$, $1/3 \leq p < 1/2$, $1/2 \leq p < 2/3$, and $2/3 \leq p \leq 1$, the system may determine the barycentric weights for the target pixel value p based on weight vectors of $[1-3p, p, p, p]$, $[1-2p, p, 1-2p, 3p-1]$, $[2p-1, 2p-1, 2-3p, 1-p]$, and $[1-p, 1-p, 1-p, 3p-2]$, respectively. Each component of the weight vectors may correspond to a barycentric weight. The four pixel value ranges of $0 \leq p < 1/3$, $1/3 \leq p < 1/2$, $1/2 \leq p < 2/3$, and $2/3 \leq p \leq 1$ may be associated with four tetrahedrons which are associated with subframe combination identifiers of [OFF, S1, S2, S3], [S1, S2, S3, S1+3], [S1+S3, S2+S3, S2, S1+S2], and [S1+S3, S2+S3, S1+S2, S1+S2+S3], respectively. The system may determine four non-overlapping dot sets of the dithering mask based on the barycentric weight values of the target pixel value and assign the dots of the non-overlapping dot sets to different subframes based on the corresponding subframe combination identifiers, as will be described later in this disclosure.

In particular embodiments, when the target pixel value p falls within the value range of $0 \leq p < 1/3$, the system may determine that the target pixel value p falls within the first tetrahedron of the four tetrahedrons of the unit cube. The system may determine the barycentric weights based on a weight vector of $[1-3p, p, p, p]$ associated with the first tetrahedron of the unit cube. Each component of the weight vector may be used for determining a corresponding barycentric weight. The system may use a subframe identifier vector of [OFF, S1, S2, S3], which is associated with the first tetrahedron, for determining the combinations of subframes for the pixel value range of $0 \leq p < 1/3$. Each component of the subframe identifier vector may correspond to a combination of zero or more subframe identifiers. Then, the system may determine four non-overlapping dot sets of the dithering mask based on the four barycentric weights of 1−3p, p, p, and p. For example, the system may determine a first dot set A1 including dots in the dithering mask having threshold values below 1−3p, a second dot set B1 including dots in the dithering mask having threshold values in the range of [1−3p, (1−3p)+p], a third dot set C1 including dots in the dithering mask having threshold values in the range of [(1−3p)+p, (1−3p)+p+p], and a fourth dot set D1 including dots in the dithering mask having threshold values on the range of [(1−3p)+p+p, 1]. Each dot set of the four non-overlapping dot sets may include a percentage of dots of the total dots of the dithering mask corresponding to a barycentric weight value of [1−3p, p, p, p]. In particular embodiments, the system may generate three subframes based on the four non-overlapping dot sets by: (1) excluding the dots the first dot set A1 from any of the three subframes (i.e., the dots of the first dot set A1 are not turned on in any subframes and remain dark); (2) including (i.e., turning on) the dots in the second dot set B1 in the first subframe S1; (3) including (i.e., turning on) the dost in the third dot set C1 in the second subframe S2; and (4) including (i.e., turning on) the dots in the fourth dot set D1 in the third subframe S3. As a result, the three subframes may each include a unique dot set which does not share any dots with other subframes, and therefore satisfy the spatial stacking property.

As an example not by way limitation, for a target pixel value p=0.1 from a target image, the system may select the barycentric coordinate system corresponding to the first tetrahedron, which is associated with subframe identifiers of [OFF, S1, S2, S3], based on a determination that the pixel value 0.1 falls within the first tetrahedron. The system may determine, for the target pixel value p=0.1, the barycentric weight values of [0.7, 0.1, 0.1, 0.1] based on the weight vector of $[1-3p, p, p, p]$ associated with the first tetrahedron. Then, the system may determine, using the dithering mask having a blue-noise property, four non-overlapping dot sets having 70%, 10%, 10%, and 10% of the total dots of the dithering mask, respectively. The threshold values associated with the dots in the dithering mask may be normalized into a range of [0, 1]. The first dot set may include the dots of the dithering mask having threshold values below 0.7. The second dot set may include the dots of the dithering mask having threshold values in the range of [0.7, 0.8]. The third dot set may include the dots of the dithering mask having threshold values in the range of [0.8, 0.9]. The fourth dot set may include the dots of the dithering mask having threshold values in the range of [0.9, 1]. For generating three subframes to represent the target image, the system may exclude the dots of the first dot set, which includes the dots of the dithering mask having threshold values below 0.7, from any subframes. In order words, the dots of the first dot set may be turned off and kept dark. The system may include the dots of the second dot set, which includes the dots of the dithering mask having threshold values in the range of [0.7, 0.8], in the first subframe S1. In other words, the dots of the second dot set may be turned on in the first subframe S1. The system may include the dots of the third dot set, which includes the dots in the dithering mask having threshold values in the range of [0.8, 0.9], in the second subframe S2. In other words, the dots of the third dot set may be turned on in the second subframe S2. Then, the system may include the dots of the fourth dot set, which include the dots in the dithering mask having threshold values in the range of [0.9, 1], in the second subframe S3. In other words, the dots of the fourth dot set may be turned on in the second subframe S3. As a result, the system may generate three subframes satisfying the spatial stacking property as determined by the non-overlapping dot sets and the dithering mask. The first, second, and third subframes may each include 10% dots of the total dots in the dithering mask. The dot densities (percentage of dots with respect to the total dots in the dithering mask) for representing the target pixel value in the three subframes may have a temporal average value of 0.1 matching the target pixel value 0.1.

In particular embodiments, when the target pixel value p falls within the value range of ⅓≤p<½, the system may determine that the target pixel value p falls within the second tetrahedron of the four tetrahedrons of the unit cube. The system may determine the barycentric weights based on a weight vector of [1−2p, p, 1−2p, 3p−1] which is associated with the second tetrahedron of the unit cube. Each component of the weight vector may be used to determine a corresponding barycentric weight. The system may use a subframe identifier vector of [S1, S2, S3, S1+S3], which is associated with the second tetrahedron, for determining the combinations of subframes for the pixel value range of ⅓≤p<½. Each component of the subframe identifier vector may correspond to a combination of zero or more subframe identifiers. Then, the system may determine four non-overlapping dot sets of the dithering mask based on the four barycentric weights of 1−2p, p, 1−2p, and 3p−1. For example, the system may determine a first dot set A2 including dots in the dithering mask having threshold values below 1−2p, a second dot set B2 including dots in the dithering mask having threshold values in the range of [1−2p, (1−2p)+p], a third dot set C1 including dots in the dithering mask having threshold values in the range of [(1-2p)+p, (1−2p)+p+(1−2p)], and a fourth dot set D1 including dots in the dithering mask having threshold values on the range of [(1−2p)+p+(1−2p), 1]. Each dot set of the four non-overlapping dot sets may include a percentage of dots of the total dots in the mask corresponding to a barycentric weight value of [1−2p, p, 1−2p, 3p−1]. In particular embodiments, the system may generate the three subframes based on the four non-overlapping dot sets by: (1) including (i.e., turning on) the dots the first dot set A2 in the first subframe S1; (2) including (i.e., turning on) the dots in the second dot set B2 in the second subframe S2; (3) including (i.e., turning on) the dost in the third dot set C2 in the third subframe S3; and (4) including (i.e., turning on) the dots in the fourth dot set D2 in the first and third subframe S1+S3. As a result, the three subframes may include dot sets satisfying the spatial stacking property as determined by the dithering mask.

As an example not by way limitation, for a target pixel value p=0.4 from a target image, the system may select the barycentric coordinate system corresponding to the second tetrahedron, which is associated with subframe identifiers of [S1, S2, S3, S1+S3], based on a determination that the pixel value 0.4 falls within the second tetrahedron. The system may determine, for the target pixel value p=0.4, the barycentric weight values of [0.2, 0.4, 0.2, 0.2] based on the weight vector of [1−2p, p, 1−2p, 3p−1] associated with the second tetrahedron. Then, the system may determine, using the dithering mask having a blue-noise property, four non-overlapping dot sets having 20%, 40%, 20%, and 20% of the total dots of the dithering mask, respectively. The threshold values associated with the dots in the dithering mask may be normalized into a range of [0, 1]. The first dot set may include the dots of the dithering mask having threshold values below 0.2. The second dot set may include the dots of the dithering mask having threshold values in the range of [0.2, 0.6]. The third dot set may include the dots of the dithering mask having threshold values in the range of [0.6, 0.8]. The fourth dot set may include the dots of the dithering mask having threshold values in the range of [0.8, 1]. For generating three subframes to represent the target image, the system may include the dots of the first dot set, which includes the dots of the dithering mask having threshold values below 0.2, in the first subframe S1. In order words, the dots of the first dot set may be turned on in the first subframe S1. The system may include the dots of the second dot set, which includes the dots of the dithering mask having threshold values in the range of [0.2, 0.6], in the second subframe S2. In other words, the dots of the second dot set may be turned on in the second subframe S2. The system may include the dots of the third dot set, which includes the dots in the dithering mask having threshold values in the range of [0.6, 0.8], in the third subframe S3. In other words, the dots of the third dot set may be turned on in the third subframe S3. Then, the system may include the dots of the fourth dot set, which includes the dots in the dithering mask having threshold values in the range of [0.8, 1], in the first and third subframe S1+S3. In other words, the dots of the fourth dot set may be turned on in the first and third subframes S1+S3. As a result, the system may generate three subframes satisfying the spatial stacking property as determined by the dithering mask. The first, second, and third subframe may each include 40% dots of the total dots of the dithering mask for representing the target pixel value. The temporal average of the dot densities in the three subframes (percentage of dots with respect to the total dots in the dithering mask) may equal to 0.4 matching the target pixel value 0.4.

In particular embodiments, when the target pixel value p falls within the value range of ½≤p<⅔, the system may determine that the target pixel value p falls within the third tetrahedron of the four tetrahedrons of the unit cube. The system may determine the barycentric weights based on a weight vector of [2p−1, 2p−1, 2−3p, 1] which is associated with the third tetrahedron of the unit cube. Each component of the weight vector may be used to determine a corresponding barycentric weight. The system may use a subframe identifier vector of [S1+S3, S2+S3, S2, S1+S2], which is associated with the third tetrahedron, for determining the combinations of subframes for the pixel value range of ½≤p<⅔. Each component of the subframe identifier vector may correspond to a combination of zero or more subframe identifiers. Then, the system may determine four non-overlapping dot sets of the dithering mask based on the four barycentric weights of 2p−1, 2p−1, 2−3p, and 1−p. For example, the system may determine a first dot set A3 including dots in the dithering mask having threshold values below 2p−1, a second dot set B3 including dots in the dithering mask having threshold values in the range of [2p−1, (2p−1)+(2p−1)], a third dot set C3 including dots in the dithering mask having threshold values in the range of [(2p−1)+(2p−1), (2p−1)+(2p−1)+(2−3p)], and a fourth dot set D3 including dots in the dithering mask having threshold values on the range of [(2p−1)+(2p−1)+(2−3p), 1]. Each dot set of the four non-overlapping dot sets may include a percentage of dots of the total dots in the mask corresponding to a barycentric weight value of [2p−1, 2p−1, 2−3p, 1−p]. In particular embodiments, the system may generate the three subframes based on the four non-overlapping dot sets by: (1) including (i.e., turning on) the dots the first dot set A3 in the first and third subframes S1+S3; (2) including (i.e., turning on) the dots in the second dot set B3 in the second and third subframes S2+S3; (3) including (i.e., turning on) the dost in the third dot set C3 in the second subframe S2; and (4) including (i.e., turning on) the dots in the fourth dot set D3 in the first and second subframe S1+S2. As a result, the three subframes may include dot sets satisfying the spatial stacking property as determined by the dithering mask.

As an example not by way limitation, for a target pixel value p=0.6 from a target image, the system may select the barycentric coordinate system corresponding to the third tetrahedron, which is associated with subframe identifiers of [S1+S3, S2+S3, S2, S1+S2], based on a determination that the pixel value 0.6 falls within the third tetrahedron. The system may determine, for the target pixel value p=0.6, the barycentric weight values of [0.2, 0.2, 0.2, 0.4] based on the weight vector of [2p−1, 2p−1, 2−3p, 1−p] associated with the third tetrahedron. Then, the system may determine, using the dithering mask having a blue-noise property, four non-overlapping dot sets having 20%, 20%, 20%, and 40% of the total dots of the dithering mask, respectively. The threshold values associated with the dots in the dithering mask may be normalized into a range of [0, 1]. The first dot set may include the dots of the dithering mask having threshold values below 0.2. The second dot set may include the dots of the dithering mask having threshold values in the range of [0.2, 0.4]. The third dot set may include the dots of the dithering mask having threshold values in the range of [0.4, 0.6]. The fourth dot set may include the dots of the dithering mask having threshold values in the range of [0.6, 1]. For generating the three subframes to represent the target image, the system may include the dots of the first dot set, which includes the dots of the dithering mask having threshold values below 0.2, in the first and third subframes S1+S3. In order words, the dots of the first dot set may be turned on in the first and third subframes S1+S3. The system may include the dots of the second dot set, which includes the dots of the dithering mask having threshold values in the range of [0.2, 0.4], in the second and third subframes S2+S3. In other words, the dots of the second dot set may be turned on in the second and third subframes S2+S3. The system may include the dots of the third dot set, which includes the dots in the dithering mask having threshold values in the range of [0.4, 0.6], in the second subframe S2. In other words, the dots of the third dot set may be turned on in the second subframe S2. Then, the system may include the dots of the fourth dot set, which includes the dots in the dithering mask having threshold values in the range of [0.6, 1], in the first and second subframe S1+S2. In other words, the dots of the fourth dot set may be turned on in the first and second subframes S1+S2. As a result, the system may generate three subframes satisfying the spatial stacking property as determined by the dithering mask. The first, second, and third subframe may include 60%, 80%, and 40% dots of the total dots of the dithering mask, respectively, for representing the target pixel value. The dot densities (percentage of dots with respect to the total dots in the dithering mask) in three subframes may have a temporal average equal to 0.6 matching the target pixel value 0.6.

In particular embodiments, when the target pixel value p falls within the value range of ⅔≤p<1, the system may determine that the target pixel value p falls within the fourth tetrahedron of the four tetrahedrons of the unit cube. The system may determine the barycentric weights based on a weight vector of [1−p, 1−p, 1−p, 3p−2] which is associated with the fourth tetrahedron. Each component of the weight vector may be used to determine a barycentric weight. The system may use a subframe identifier vector of [S1+S3, S2+S3, S1+S2, S1+S2+S3], which is associated with the fourth tetrahedron, for determining the combinations of subframes for the pixel value range of ⅔≤p<1. Each component of the subframe identifier vector may correspond to a combination of zero or more subframe identifiers. Then, the system may determine four non-overlapping dot sets of the dithering mask based on the four barycentric weights of 1−p, 1−p, 1−p, and 3p−2. For example, the system may determine a first dot set A4 including dots in the dithering mask having threshold values below 1−p, a second dot set B4 including dots in the dithering mask having threshold values in the range of [1−p, (1−p)+(1−p)], a third dot set C4 including dots in the dithering mask having threshold values in the range of [(1−p)+(1−p), (1−p)+(1−p)+(1−p)], and a fourth dot set D4 including dots in the dithering mask having threshold values on the range of [(1−p)+(1−p)+(1−p), 1]. Each dot set of the four non-overlapping dot sets may include a percentage of dots of the total dots in the mask corresponding to a barycentric weight value of [1−p, 1−p, 1−p, 3p−2p]. In particular embodiments, the system may generate three subframes based on the four non-overlapping dot sets by: (1) including (i.e., turning on) the dots the first dot set A4 in the first and third subframes S1+S3; (2) including (i.e., turning on) the dots in the second dot set B4 in the second and third subframes S2+S3; (3) including (i.e., turning on) the dost in the third dot set C4 in the first and second subframes S1+S2; and (4) including (i.e., turning on) the dots in the fourth dot set D4 in the first, second, and third subframes S1+S2+S3. As a result, the three subframes may include dot sets satisfying the spatial stacking property as determined by the dithering mask.

As an example not by way limitation, for a target pixel value p=0.7 from a target image, the system may select the barycentric coordinate system corresponding to the fourth tetrahedron, which is associated with subframe identifiers of [S1+S3, S2+S3, S1+S2, S1+S2+S3], based on a determination that the pixel value 0.7 falls within the fourth tetrahedron. The system may determine, for the target pixel value p=0.7, the barycentric weight values of [0.3, 0.3, 0.3, 0.1] based on the weight vector of [1−p, 1−p, 1−p, 3p−2] associated with the fourth tetrahedron. Then, the system may determine, using the dithering mask having a blue-noise property, four non-overlapping dot sets having 30%, 30%, 30%, and 10% of the total dots of the dithering mask, respectively. The threshold values associated with the dots in the dithering mask may be normalized into a range of [0, 1]. The first dot set may include the dots of the dithering mask having threshold values below 0.3. The second dot set may include the dots of the dithering mask having threshold values in the range of [0.3, 0.6]. The third dot set may include the dots of the dithering mask having threshold values in the range of [0.6, 0.9]. The fourth dot set may include the dots of the dithering mask having threshold values in the range of [0.9, 1]. For generating the three subframes to represent the target image, the system may include the dots of the first dot set, which includes the dots of the dithering mask having threshold values below 0.3, in the first and third subframes S1+S3. In order words, the dots of the first dot set may be turned on in the first and third subframes S1+S3. The system may include the dots of the second dot set, which includes the dots of the dithering mask having threshold values in the range of [0.3, 0.6], in the second and third subframes S2+S3. In other words, the dots of the second dot set may be turned on in the second and third subframes S2+S3. The system may include the dots of the third dot set, which includes the dots in the dithering mask having threshold values in the range of [0.6, 0.9], in the first and second subframes S1+S2. In other words, the dots of the third dot set may be turned on in the first and second subframe S1+S2. Then, the system may include the dots of the fourth dot set, which includes the dots in the dithering mask having threshold values in the range of [0.9, 1], in the first, second, and third subframe S1+S2+S3. In other words, the dots of the fourth dot set may be turned on in the first, second, and third subframes S1+S2+S3. As a result, the system may generate three subframes satisfying the spatial stacking property as determined by the dithering mask. The first, second, and third subframe may each include 70% dots of the total dots of the dithering mask for representing the target pixel value. The temporal average of the dot density (percentage of dots with respect to the total dots in the dithering mask) of the three subframes may equal to 0.7 matching the target pixel value 0.7.

In particular embodiments, for an image having a larger size than the dithering mask, the dithering mask may be replicated to cover the image. To determine which subframe(s) should include a given dot of the dithering mask, the system may first determine a threshold value Q associated with that dot based on a replicated dithering mask using the following equation:

$$Q = \text{mask}(\text{mod}(x,M)+1, \text{mod}(y,M)+1) \quad (1)$$

where, x and y are position coordinates of an associated pixel of the dot, M×M is the size of the dithering mask, mod is the module operator. Since the barycentric weights of a target pixel value with respect to a barycentric coordinate system may sum to unity and the threshold values of the blue noise mask may normalized to a range of [0, 1], the system use the mask to choose the tetrahedron vertex based on the cumulative sum of the barycentric weights. In particular embodiments, the tetrahedron vertex $v_k$ may be chosen when the sum of the first k barycentric weights exceeds the threshold value Q associated with that dot as represented by the following equation:

$$v = v_k \text{ for which } \sum_i^k w_i > Q \quad (1)$$

where, $v_k$ is the selected tetrahedron vertex, $w_i$ is the i-th barycentric weight, Q is the threshold hold value associated with that dot. The system may compare the threshold value Q to the cumulative sum of the barycentric weights of the target grayscale value with respect to the associated barycentric coordinate system. The system may select the tetrahedron vertex $v_k$ when the sum of the first k barycentric weights exceeds the threshold value Q. The tetrahedron vertex $v_k$ may be associated with zero or more subframe identifiers. The system may assign this dot to the zero or more subframes corresponding to the selected tetrahedron vertex $v_k$.

As an example and not by way of limitation, for a target pixel value of 0.1, the system may determine barycentric weights of [0.7, 0.1, 0.1, 0.1] with respect to a barycentric coordinate system corresponding to a tetrahedron that the target pixel value falls within. The four vertices of the tetrahedron may be associated with subframe identifiers of OFF, S1, S2, and S3, respectively. Given a threshold value Q in a range of $0 \leq p < 0.7$, the system may select the first vertex $v_1$ based on a determination that the first barycentric weight 0.7 is greater than the threshold value Q. Since the subframe identifier corresponding to the first vertex $v_1$ is OFF, the system may not include the corresponding dot of this pixel in any subframes. Given a threshold value Q in a range of $0.7 \leq p < 0.8$, the system may select the second vertex $v_2$ based on a determination that the sum of the first barycentric weight 0.7 and the second barycentric weight 0.1 is greater than the threshold value Q. Since the subframe identifier corresponding to the second vertex $v_1$ is S1, the system may include the corresponding dot in the first subframe S1. Given a threshold value Q in a range of $0.8 \leq p < 0.9$, the system may select the third vertex $v_3$ based on a determination that the sum of the first, second, and third barycentric weight $(0.7+0.1+0.1=0.9)$ is greater than the threshold value Q. Since the subframe identifier corresponding to the third vertex $v_3$ is S2, the system may include the corresponding dot in the second subframe S2. Given a threshold value Q in a range of $0.9 \leq p < 1$, the system may select the fourth vertex $v_4$ based on a determination that the sum of the first, second, third, and third barycentric weights $(0.7+0.1+0.1+0.1=1)$ is greater than the threshold value Q. Since the subframe identifier corresponding to the fourth vertex $v_4$ is S3, the system may include the corresponding dot of this pixel in the third subframe S3.

FIG. 7 illustrates an example method 700 for generating a number of subframes based on a barycentric coordinate system and a dithering mask for representing a target frame. The method may begin at step 710, where a computing system may determine that a target grayscale value p for a frame falls within one of a number of predetermined grayscale ranges. At step 720, the system may compute, based on the target grayscale value p, barycentric weights for a predetermined barycentric coordinate system associated with one of the predetermined grayscale ranges. The barycentric coordinate system may be associated with vertices that each represents a combination of zero or more subframe identifiers selected from a number of subframe identifiers. At step 730, the system may select, using the barycentric weights and threshold values associated with respective dots in a dithering mask, a set of non-overlapping dot patterns from the dithering mask corresponding to the vertices of the barycentric coordinate system. The dots in the dithering mask may satisfy a spatial stacking constraint according to the threshold values associated with the dots. At step 740, the system may generate a number of subframes corresponding to the subframe identifiers to represent the frame. The subframes may be generated based on the set of non-overlapping dot patterns and the subframe combination represented by each of the vertices.

In particular embodiments, the barycentric coordinate system may correspond to a tetrahedron of a unit cube. The vertices of the barycentric coordinate system may correspond to four vertices of the tetrahedron for representing four combinations of subframe identifiers. Each combination of subframe identifiers may include zero or more subframe identifiers. In particular embodiments, the set of non-overlapping dot patterns may be selected based on a comparison between accumulative barycentric weight values and corresponding threshold values of the dithering mask. In particular embodiments, each dot of the dithering mask may correspond to a threshold value. The threshold value associated with a dot may correspond to a smallest threshold value associated with a dot pattern including that dot. The dithering mask may have a blue-noise property and may include a number of dot patterns each satisfying the spatial stacking constraint by including all dot patterns associated with smaller threshold values.

In particular embodiments, the subframes may include three subframes. When the grayscale value p is in a range of $0 \leq p < 1/3$, the system may determine the barycentric weights using a weight vector of $[1-3p, p, p, p]$. The corresponding subframe identifiers may include four subframe identifiers corresponding to OFF, a first subframe S1, a second subframe S2, and a third subframe S3, respectively. In particular embodiments, the set of non-overlapping dot patterns may include a first non-overlapping dot pattern comprising dots in the dithering mask having threshold values below a first threshold of $1-3p$, a second non-overlapping dot pattern comprising dots in the dithering mask having threshold values in a range of $[1-3p, 1-2p]$, a third non-overlapping dot pattern comprising dots in the dithering mask having threshold values in a range of $[1-2p, 1-p]$, and a fourth non-overlapping dot pattern comprising dots in the dithering mask having threshold values in a range of $[1-p, 1]$. In particular embodiments, the first, second and third subframes may be generated by: excluding dots in the first non-overlapping dot pattern from the first, second and third subframes, including dots in the second non-overlapping dot pattern to the first subframe S1, including dots in the third non-overlapping dot pattern to the second subframe S2, and including dots in the fourth non-overlapping dot pattern to the third subframe S3.

In particular embodiments, when the grayscale value is in a range of $1/3 \leq p < 1/2$, the system may determine the barycentric weights using a weight vector of $[1-2p, p, 1-2p, 3p-1]$. The corresponding subframe identifiers may include four subframe identifiers corresponding to a first subframe S1, a second subframe S2, a third subframe S3, and a combination of the first subframe S1 and the third subframe S3, respectively. In particular embodiments, the set of non-overlapping dot patterns may include a first non-overlapping dot pattern comprising dots in the dithering mask having threshold values below a first threshold of $1-2p$, a second non-overlapping dot pattern comprising dots in the dithering mask having threshold values in a range of $[1-2p, 1-p]$, a third non-overlapping dot pattern comprising dots in the dithering mask having threshold values in a range of $[1-p, 2-3p]$, and a fourth non-overlapping dot pattern comprising dots in the dithering mask having threshold values in a range of $[2-3p, 1]$. In particular embodiments, the first, second and third subframes may be generated by: including dots in the first non-overlapping dot pattern to the first subframe S1, including dots in the second non-overlapping dot pattern to the second subframe S2, including dots in the third non-overlapping dot pattern to the third subframe S3, and including dots in the fourth non-overlapping dot pattern to the first subframe S1 and the third subframe S3.

In particular embodiments, when the grayscale value p is in a range of $1/2 \leq p < 2/3$, the system may determine the barycentric weights using a weight vector of $[2p-1, 2p-1, 2-3p, 1-p]$. The corresponding subframe identifiers may include four subframe identifiers corresponding to a first combination of a first subframe S1 and a third subframe S3, a second combination of a second subframe S2 and the third subframe S3, the second subframe S2, and a third combination of the first subframe S1 and the second subframe S2, respectively. In particular embodiments, the set of non-overlapping dot patterns may include a first non-overlapping dot pattern comprising dots on the dithering mask having threshold values below a first threshold of $2p-1$, a second non-overlapping dot pattern comprising dots in the dithering mask having threshold values in a range $[2p-1, 4p-2]$, a third non-overlapping dot pattern comprising dots in the dithering mask having threshold values in a region of $[4p-2, p]$, and a fourth non-overlapping dot pattern comprising dots in the dithering mask having threshold values in a range of $[p, 1]$. In particular embodiments, the first, second and third subframes are generated by: including dots in the first non-overlapping dot pattern to the first subframe S1 and the third subframe S3, including dots in the second non-overlapping dot pattern to the second subframe S2 and the third subframe S3, including dots in the third non-overlapping dot pattern to the second subframe S2, and including dots in the fourth non-overlapping dot pattern to the first subframe S1 and the second subframe S2.

In particular embodiments, when the grayscale value p is in a range of $2/3 \leq p < 1$, the system may determine barycentric weights using a weight vector of $[1-p, 1-p, 1-p, 3p-2]$. The corresponding subframe identifiers may include four subframe identifiers corresponding to a first combination of a first subframe S1 and a third subframe S3, a second combination of a second subframe S2 and the third subframe S3, a third combination of the first subframe S1 and the second subframe S2, and a third combination of the first subframe S1, the second subframe S2, and the third subframe S3, respectively. In particular embodiments, the set of non-overlapping dot patterns may include a first non-overlapping dot pattern comprising dots in the dithering mask having threshold values below a first threshold of $1-p$, a second non-overlapping dot pattern comprising dots in the dithering mask having threshold values in a range of $[1-p, 2-2p]$, a third non-overlapping dot pattern comprising dots in the dithering mask having threshold values in a range of $[2-2p, 3-3p]$, and a fourth non-overlapping dot pattern comprising dots in the dithering mask having threshold values in a range of $[3-3p, 1]$. In particular embodiments, the first, second and third subframes may be generated by: including dots in the first non-overlapping dot pattern to the first subframe S1 and the third subframe S3, including dots in the second non-overlapping dot pattern to the second subframe S2 and the third subframe S3, including dots in the third non-overlapping dot pattern to the first subframe S1 and the second subframe S2, and including dots in the fourth non-overlapping dot pattern to the first subframe S1, the second subframe S2, and the third subframe S3. In particular embodiments, the target grayscale value may be an average grayscale value of a target region of a target image. The target image may have a larger size than the dithering mask. The dithering mask may be replicated to cover the target image.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating a number of subframes based on a barycentric coordinate system and a dithering mask for representing a target frame including the particular steps of the method of FIG. 7, this disclosure contemplates any suitable method for generating a number of subframes based on a barycentric coordinate system and a dithering mask for representing a target frame including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
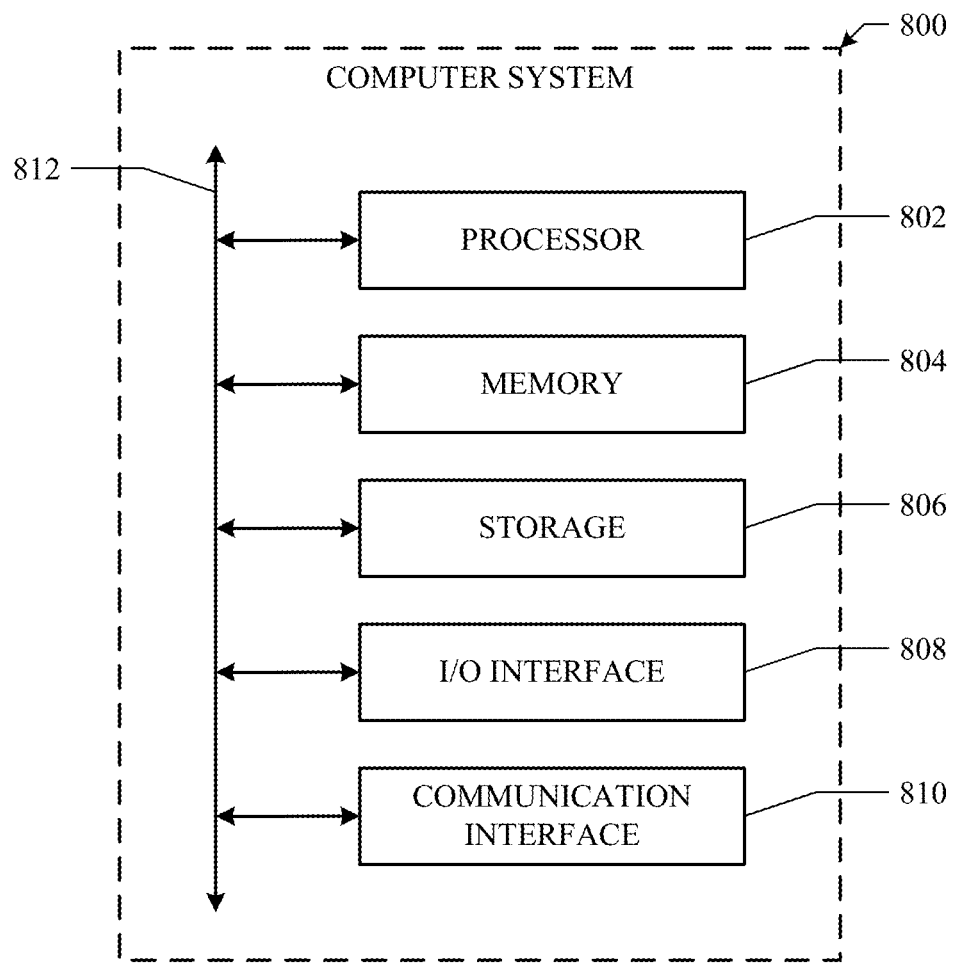
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining that a target grayscale value p for a frame falls within one of a plurality of predetermined grayscale ranges;
   computing, based on the target grayscale value p, barycentric weights for a predetermined barycentric coordinate system associated with the predetermined grayscale ranges, wherein the barycentric coordinate system is associated with vertices that each represents a subframe combination of zero or more subframe identifiers selected from a plurality of subframe identifiers;
   selecting, using the barycentric weights and threshold values associated with respective dots in a dithering mask, a set of non-overlapping dot patterns from the dithering mask corresponding to the vertices of the barycentric coordinate system, wherein the dots in the dithering mask satisfy a spatial stacking constraint according to the threshold values associated with the dots; and
   generating a plurality of subframes corresponding to the plurality of subframe identifiers to represent the frame, wherein the plurality of subframes are generated based on the set of non-overlapping dot patterns and the subframe combination represented by each of the vertices.

2. The method of claim 1, wherein the barycentric coordinate system corresponds to a tetrahedron of a unit cube, wherein the vertices of the barycentric coordinate system correspond to four vertices of the tetrahedron for representing four combination of subframe identifiers, and wherein each combination of subframe identifiers comprises zero or more subframe identifiers.

3. The method of claim 1, wherein the set of non-overlapping dot patterns are selected based on a comparison between accumulative barycentric weight values and corresponding threshold values of the dithering mask.

4. The method of claim 1, wherein each dot of the dithering mask corresponds to a threshold value, and wherein the threshold value corresponds to a smallest threshold value which has a corresponding dot pattern comprising that dot.

5. The method of claim 4, wherein the dithering mask has a blue-noise property, wherein the dithering mask comprises a plurality of dot patterns each satisfying the spatial stacking constraint by comprising all dot patterns associated with smaller threshold values.

6. The method of claim 1, wherein the plurality of subframes comprises three subframes, wherein the grayscale value p is in a range of $0 \leq p < 1/3$, wherein the barycentric weights are determined by a weight vector of $[1-3p, p, p, p]$, and wherein the plurality of subframe identifiers comprises four subframe identifiers corresponding to OFF, a first subframe S1, a second subframe S2, and a third subframe S3, respectively.

7. The method of claim 6, wherein the set of non-overlapping dot patterns comprise:
   a first non-overlapping dot pattern comprising dots in the dithering mask having threshold values below a first threshold of $1-3p$;
   a second non-overlapping dot pattern comprising dots in the dithering mask having threshold values in a range of $[1-3p, 1-2p]$;
   a third non-overlapping dot pattern comprising dots in the dithering mask having threshold values in a range of $[1-2p, 1-p]$; and
   a fourth non-overlapping dot pattern comprising dots in the dithering mask having threshold values in a range of $[1-p, 1]$.

8. The method of claim 7, wherein the first, second and third subframes are generated by:
   excluding dots in the first non-overlapping dot pattern from the first, second and third subframes;
   including dots in the second non-overlapping dot pattern to the first subframe S1;
   including dots in the third non-overlapping dot pattern to the second subframe S2; and
   including dots in the fourth non-overlapping dot pattern to the third subframe S3.

9. The method of claim 1, wherein the plurality of subframes comprises three subframes, wherein the grayscale value is in a range of $1/3 \leq p < 1/2$, wherein the barycentric weights are determined by a weight vector of $[1-2p, p, 1-2p, 3p-1]$, and wherein the plurality of subframe identifiers comprises four subframe identifiers corresponding to a first subframe S1, a second subframe S2, a third subframe S3, and a combination of the first subframe S1 and the third subframe S3, respectively.

10. The method of claim 9, wherein the set of non-overlapping dot patterns comprise:
    a first non-overlapping dot pattern comprising dots in the dithering mask having threshold values below a first threshold of $1-2p$;
    a second non-overlapping dot pattern comprising dots in the dithering mask having threshold values in a range of $[1-2p, 1-p]$;
    a third non-overlapping dot pattern comprising dots in the dithering mask having threshold values in a range of $[1-p, 2-3p]$; and
    a fourth non-overlapping dot pattern comprising dots in the dithering mask having threshold values in a range of $[2-3p, 1]$ in the dithering mask.

11. The method of claim 10, wherein the first, second, and third subframes are generated by:
    including dots in the first non-overlapping dot pattern to the first subframe S1;
    including dots in the second non-overlapping dot pattern to the second subframe S2;
    including dots in the third non-overlapping dot pattern to the third subframe S3; and
    including dots in the fourth non-overlapping dot pattern to the first subframe S1 and the third subframe S3.

12. The method of claim 1, wherein the plurality of subframes comprises three subframes, wherein the grayscale value p is in a range of ½≤p<⅔, the barycentric weights are determined by a weight vector of [2p−1, 2p−1, 2−3p, 1−p], and wherein the plurality of subframe identifiers comprises four subframe identifiers corresponding to a first combination of a first subframe S1 and a third subframe S3, a second combination of a second subframe S2 and the third subframe S3, the second subframe S2, and a third combination of the first subframe S1 and the second subframe S2, respectively.

13. The method of claim 12, wherein the set of non-overlapping dot patterns comprise:
  a first non-overlapping dot pattern comprising dots on the dithering mask having threshold values below a first threshold of 2p−1;
  a second non-overlapping dot pattern comprising dots in the dithering mask having threshold values in a range of [2p−1, 4p−2];
  a third non-overlapping dot pattern comprising dots in the dithering mask having threshold values in a range of [4p−2, p]; and
  a fourth non-overlapping dot pattern comprising dots in the dithering mask having threshold values in a range of [p, 1].

14. The method of claim 13, wherein the first, second and third subframes are generated by:
  including dots in the first non-overlapping dot pattern to the first subframe S1 and the third subframe S3;
  including dots in the second non-overlapping dot pattern to the second subframe S2 and the third subframe S3;
  including dots in the third non-overlapping dot pattern to the second subframe S2; and
  including dots in the fourth non-overlapping dot pattern to the first subframe S1 and the second subframe S2.

15. The method of claim 1, wherein the plurality of subframes comprises three subframes, wherein the grayscale value p is in a range of ⅔≤p<1, wherein barycentric weights are determined by a weight vector of [1−p, 1−p, 1−p, 3p−2], and wherein plurality of subframe identifiers comprises four subframe identifiers corresponding to a first combination of a first subframe S1 and a third subframe S3, a second combination of a second subframe S2 and the third subframe S3, a third combination of the first subframe S1 and the second subframe S2, and a third combination of the first subframe S1, the second subframe S2, and the third subframe S3, respectively.

16. The method of claim 15, wherein the set of non-overlapping dot patterns comprise:
  a first non-overlapping dot pattern comprising dots in the dithering mask having threshold values below a first threshold of 1−p;
  a second non-overlapping dot pattern comprising dots in the dithering mask having threshold values in a range of [1−p, 2−2p];
  a third non-overlapping dot pattern comprising dots in the dithering mask having threshold values in a range of [2−2p, 3−3p]; and
  a fourth non-overlapping dot pattern comprising dots in the dithering mask having threshold values in a range of [3−3p, 1].

17. The method of claim 16, wherein the first, second and third subframes are determined by:
  including dots in the first non-overlapping dot pattern to the first subframe S1 and the third subframe S3;
  including dots in the second non-overlapping dot pattern to the second subframe S2 and the third subframe S3;
  including dots in the third non-overlapping dot pattern to the first subframe S1 and the second subframe S2; and
  including dots in the fourth non-overlapping dot pattern to the first subframe S1, the second subframe S2, and the third subframe S3.

18. The method of claim 1, wherein the target grayscale value is an average grayscale value of a target region of a target image, wherein the target image has a larger size than the dithering mask, and wherein the dithering mask is replicated to cover the target image.

19. One or more computer-readable non-transitory storage media embodying software that is operable when executed to:
  determine that a target grayscale value p for a frame falls within one of a plurality of predetermined grayscale ranges;
  compute, based on the target grayscale value p, barycentric weights for a predetermined barycentric coordinate system associated with the predetermined grayscale ranges, wherein the barycentric coordinate system is associated with vertices that each represents a subframe combination of zero or more subframe identifiers selected from a plurality of subframe identifiers;
  select, using the barycentric weights and threshold values associated with respective dots in a dithering mask, a set of non-overlapping dot patterns from the dithering mask corresponding to the vertices of the barycentric coordinate system, wherein the dots in the dithering mask satisfy a spatial stacking constraint according to the threshold values associated with the dots; and
  generate a plurality of subframes corresponding to the plurality of subframe identifiers to represent the frame, wherein the plurality of subframes are generated based on the set of non-overlapping dot patterns and the subframe combination represented by each of the vertices.

20. A system comprising:
  one or more non-transitory computer-readable storage media embodying instructions; and
  one or more processors coupled to the storage media and operable to execute the instructions to:
    determine that a target grayscale value p for a frame falls within one of a plurality of predetermined grayscale ranges;
    compute, based on the target grayscale value p, barycentric weights for a predetermined barycentric coordinate system associated with the predetermined grayscale ranges, wherein the barycentric coordinate system is associated with vertices that each represents a subframe combination of zero or more subframe identifiers selected from a plurality of subframe identifiers;
    select, using the barycentric weights and threshold values associated with respective dots in a dithering mask, a set of non-overlapping dot patterns from the dithering mask corresponding to the vertices of the barycentric coordinate system, wherein the dots in the dithering mask satisfy a spatial stacking constraint according to the threshold values associated with the dots; and
    generate a plurality of subframes corresponding to the plurality of subframe identifiers to represent the frame, wherein the plurality of subframes are generated based on the set of non-overlapping dot patterns and the subframe combination represented by each of the vertices.

* * * * *